(12) United States Patent
Shelton

(10) Patent No.: US 8,573,544 B2
(45) Date of Patent: Nov. 5, 2013

(54) APPARATUS AND METHOD FOR SUPPORTING A FLEXIBLE HOSE SPRINKLER HEAD ON AN ELEVATED IRRIGATION SUPPLY LINE

(76) Inventor: Dale Shelton, Pasco, WA (US)

( * ) Notice: Subject to any disclaimer, the term of this patent is extended or adjusted under 35 U.S.C. 154(b) by 504 days.

(21) Appl. No.: 12/814,317

(22) Filed: Jun. 11, 2010

(65) Prior Publication Data

US 2011/0303770 A1    Dec. 15, 2011

(51) Int. Cl.
   *A62C 13/76*    (2006.01)

(52) U.S. Cl.
   USPC ............... 248/75; 47/48.5; 239/162; 239/726

(58) Field of Classification Search
   USPC ............. 248/69, 75, 78, 80, 81, 83; 138/106, 138/107; 47/48.5; 239/162, 164, 169, 176, 239/726
   See application file for complete search history.

(56) References Cited

U.S. PATENT DOCUMENTS

| | | | |
|---|---|---|---|
| 770,506 A * | 9/1904 | Perkins | 239/169 |
| 1,425,067 A | 8/1922 | Stone | |
| 1,537,237 A | 5/1925 | Kaestner | |
| 1,897,248 A | 2/1933 | Ferguson | |
| 1,942,453 A | 1/1934 | Ruemein | |
| 2,446,723 A | 8/1948 | Schaechterle | |
| 2,571,388 A * | 10/1951 | Shanahan | 248/83 |
| 3,117,725 A * | 1/1964 | Palmer | 239/168 |
| 3,143,295 A * | 8/1964 | Booker | 239/142 |
| 3,599,917 A | 8/1971 | Schwartz | |
| 3,979,095 A | 9/1976 | Scholtz | |
| 3,979,096 A | 9/1976 | Zieger | |
| 4,174,822 A | 11/1979 | Larsson | |
| 4,405,085 A | 9/1983 | Meyer | |
| 4,795,100 A | 1/1989 | Purtell et al. | |
| 5,020,730 A | 6/1991 | Perroud et al. | |
| 5,516,044 A * | 5/1996 | Thorstensson | 239/159 |
| 6,021,599 A | 2/2000 | Matz | |
| 6,053,427 A * | 4/2000 | Wilger et al. | 239/159 |
| 6,126,119 A | 10/2000 | Giangrasso | |
| 6,502,796 B1 | 1/2003 | Wales | |
| 6,652,013 B1 | 11/2003 | Peterson | |
| 6,745,985 B2 * | 6/2004 | Healy | 248/75 |
| 6,783,102 B2 * | 8/2004 | Kirschner | 248/75 |
| 6,942,735 B2 * | 9/2005 | Rich | 118/313 |
| 7,017,868 B2 * | 3/2006 | Kirschner | 248/75 |
| 7,263,801 B2 | 9/2007 | McCardle et al. | |
| 7,427,051 B2 * | 9/2008 | Oh | 248/73 |
| 7,464,905 B2 | 12/2008 | Wang | |
| 7,780,123 B1 * | 8/2010 | Bailyn et al. | 248/84 |
| 7,878,464 B2 * | 2/2011 | Oh | 248/65 |
| 2005/0184203 A1 | 8/2005 | Votypka | |
| 2009/0013599 A1 | 1/2009 | Cordani | |
| 2009/0200391 A1 | 8/2009 | Yehuda et al. | |
| 2009/0300984 A1 | 12/2009 | Gordon | |
| 2009/0314905 A1 | 12/2009 | Bradberry et al. | |
| 2011/0220233 A1 | 9/2011 | Nelson et al. | |

FOREIGN PATENT DOCUMENTS

| | | |
|---|---|---|
| EP | 0190792 | 8/1986 |
| WO | PCT/US11/039868 | 11/2011 |
| WO | PCT/US2011/039868 | 12/2012 |

* cited by examiner

*Primary Examiner* — Bradley Duckworth
(74) *Attorney, Agent, or Firm* — Wells St. John P.S.

(57) ABSTRACT

An adaptive support is provided for a flexible hose sprinkler head on an elevated irrigation supply line that includes a sprinkler support body and a hanger body. The sprinkler support body has a first inter-fitting contact surface. The body is disposed to support a downwardly extending flexible sprinkler hose. The hanger body has a second inter-fitting contact surface configured to mate with the first inter-fitting contact surface. The hanger body is disposed to support the sprinkler body at an elevated position. A method is also provided for changing elevation of a sprinkler head.

40 Claims, 23 Drawing Sheets

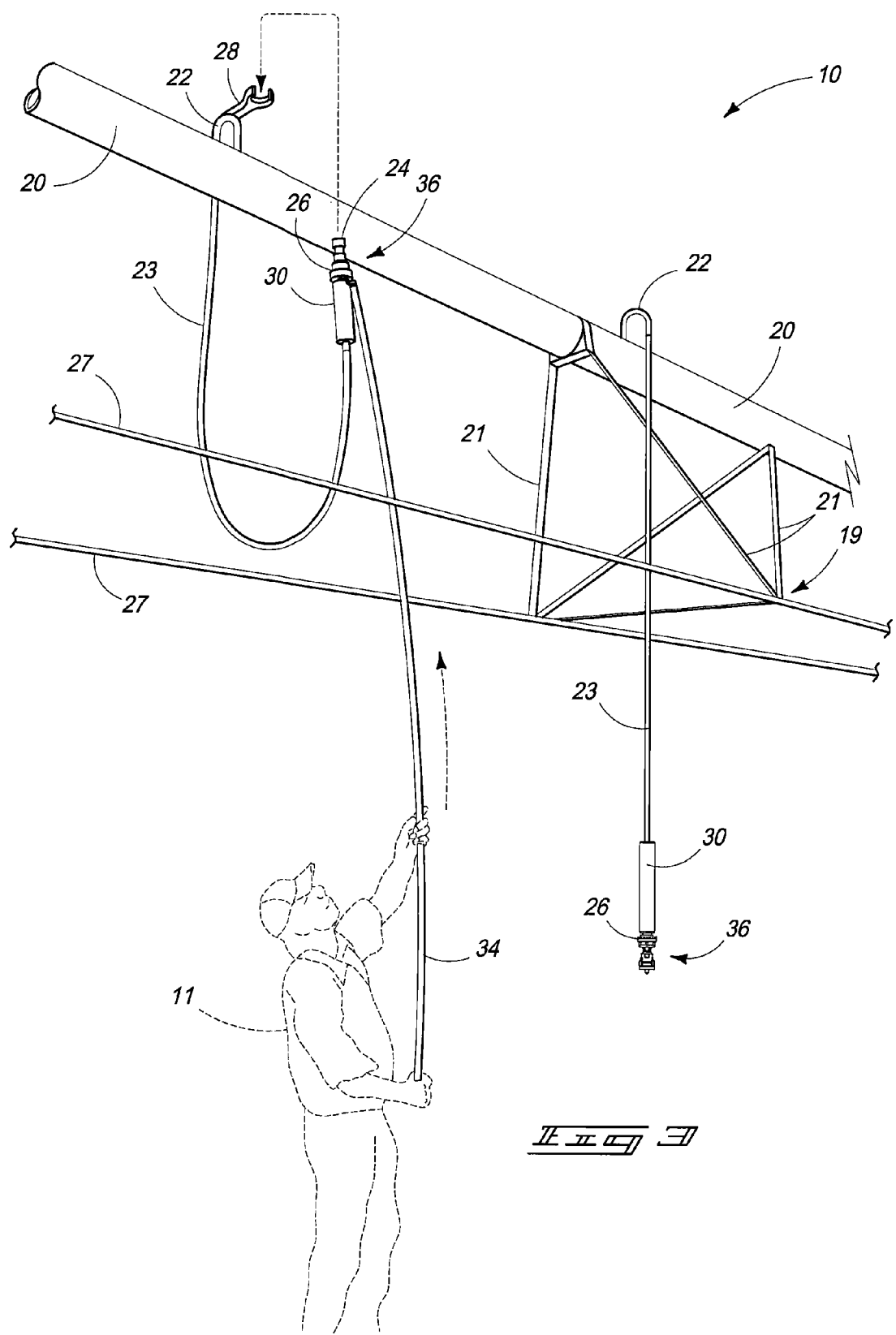

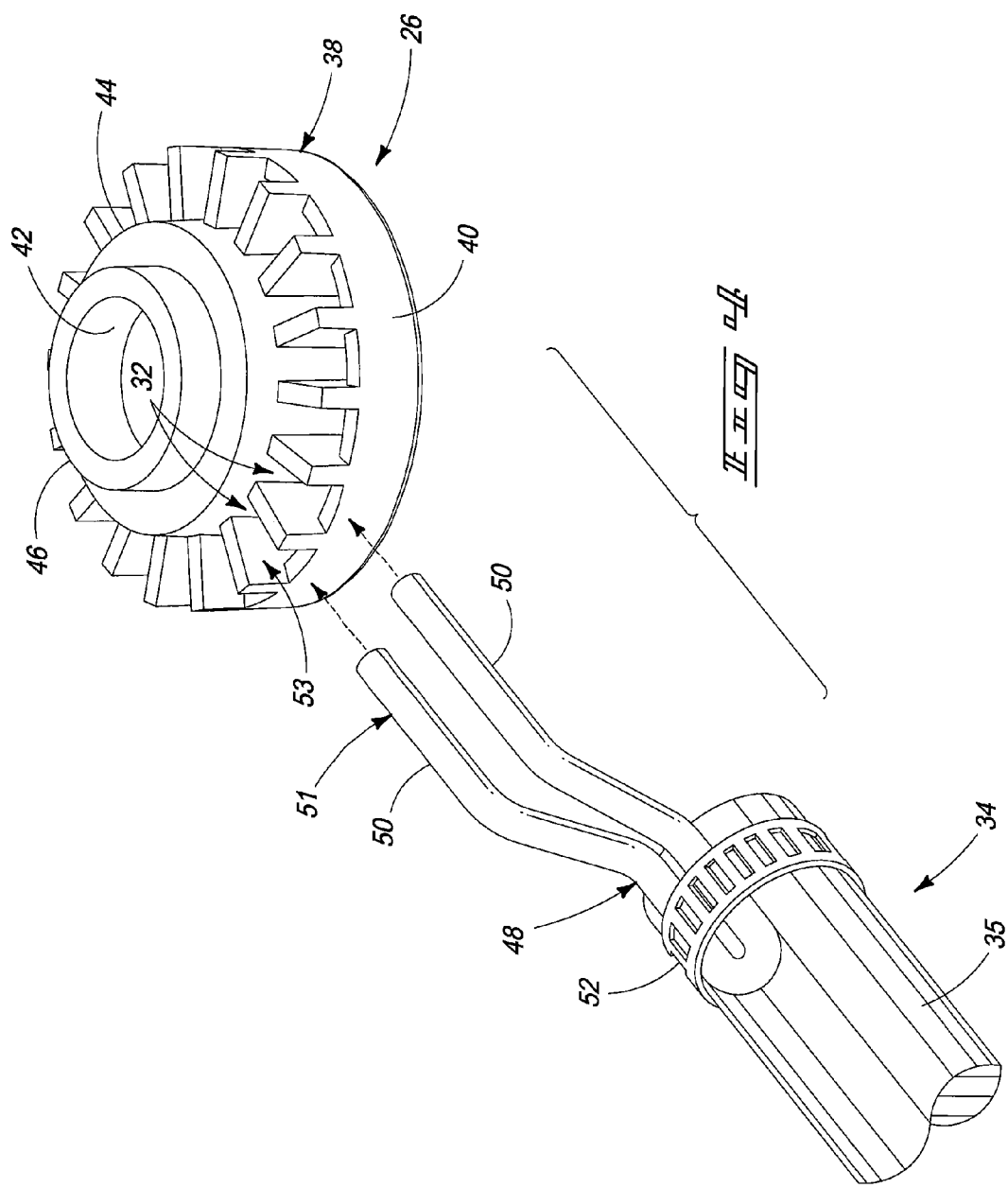

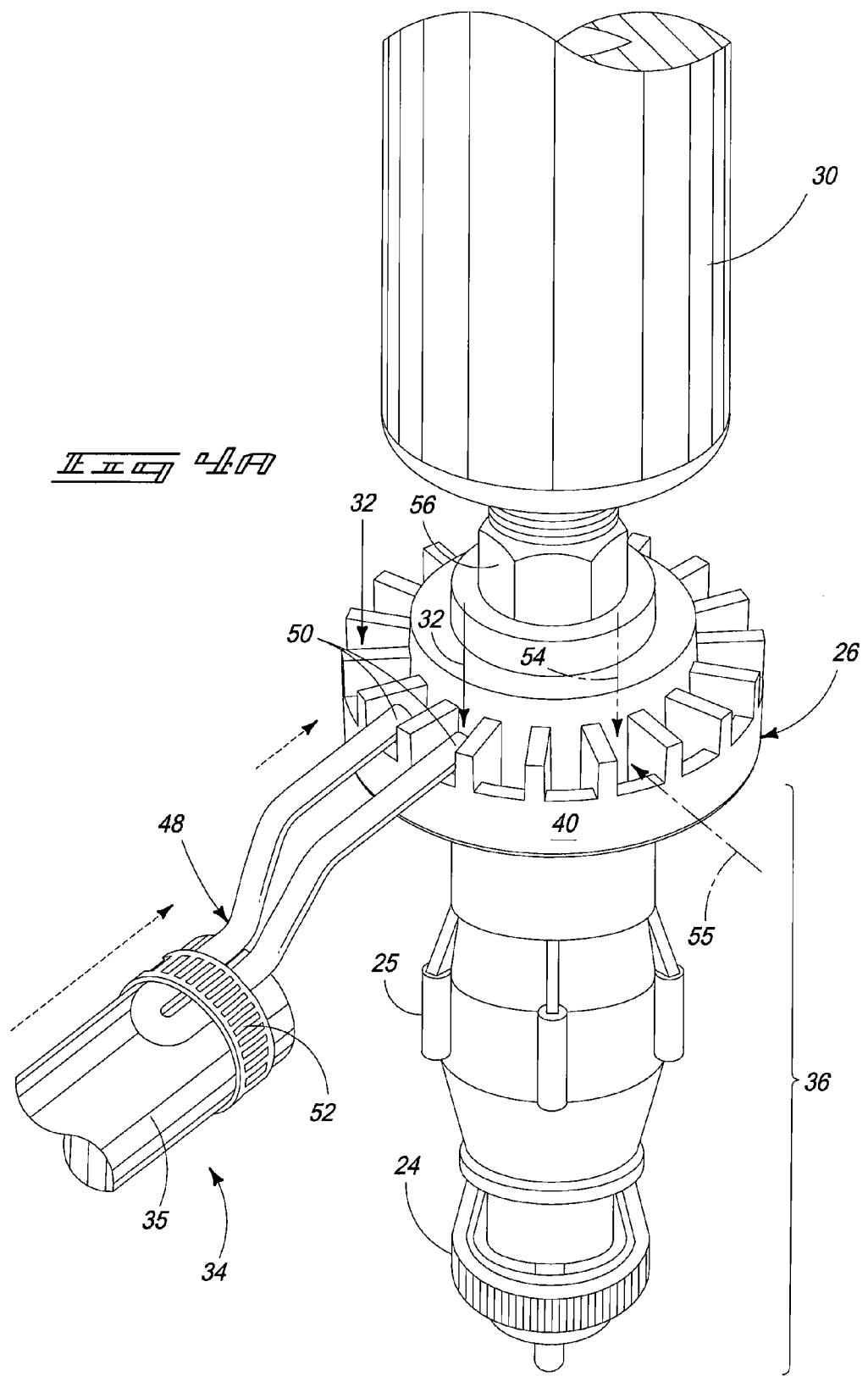

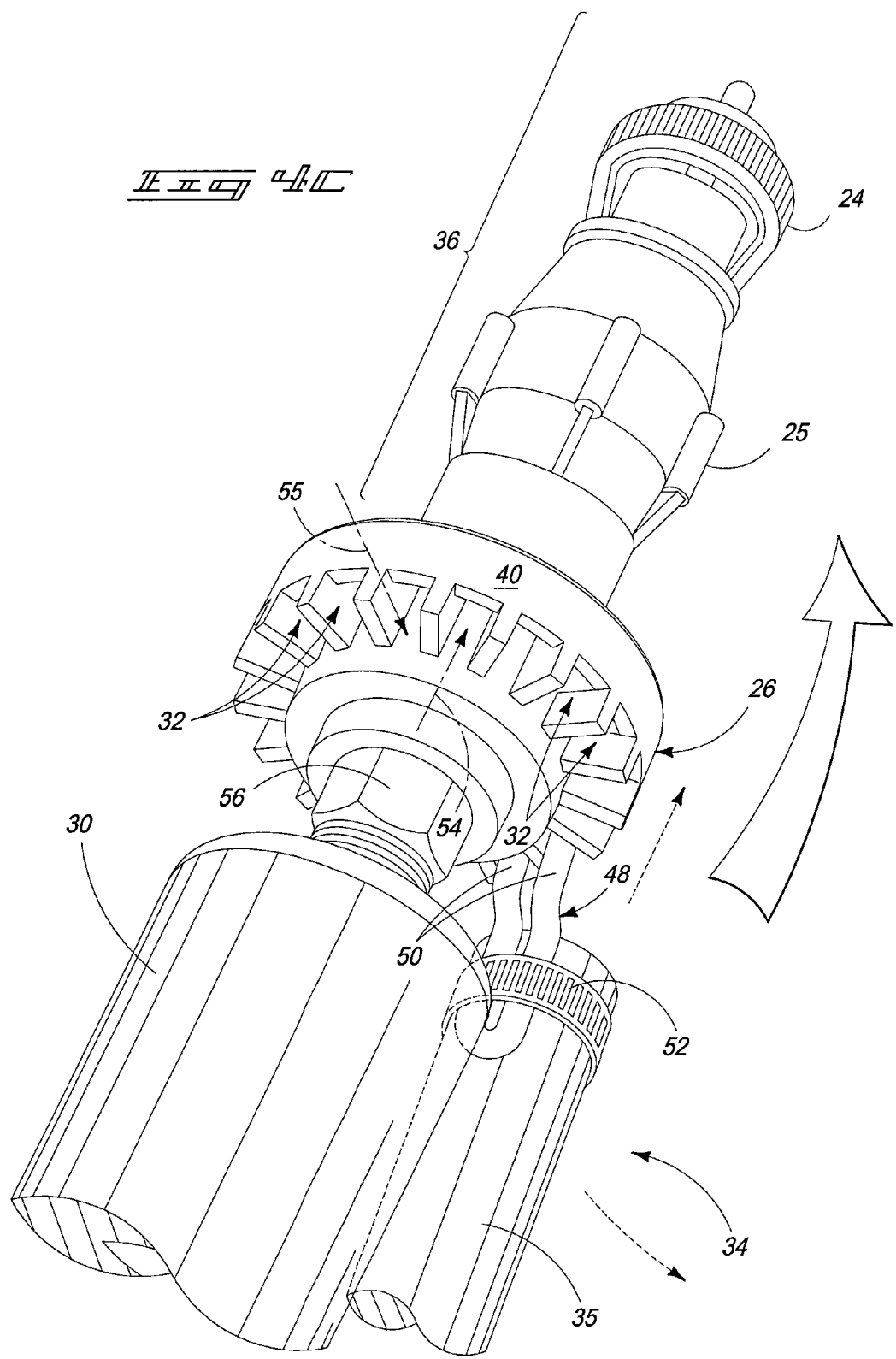

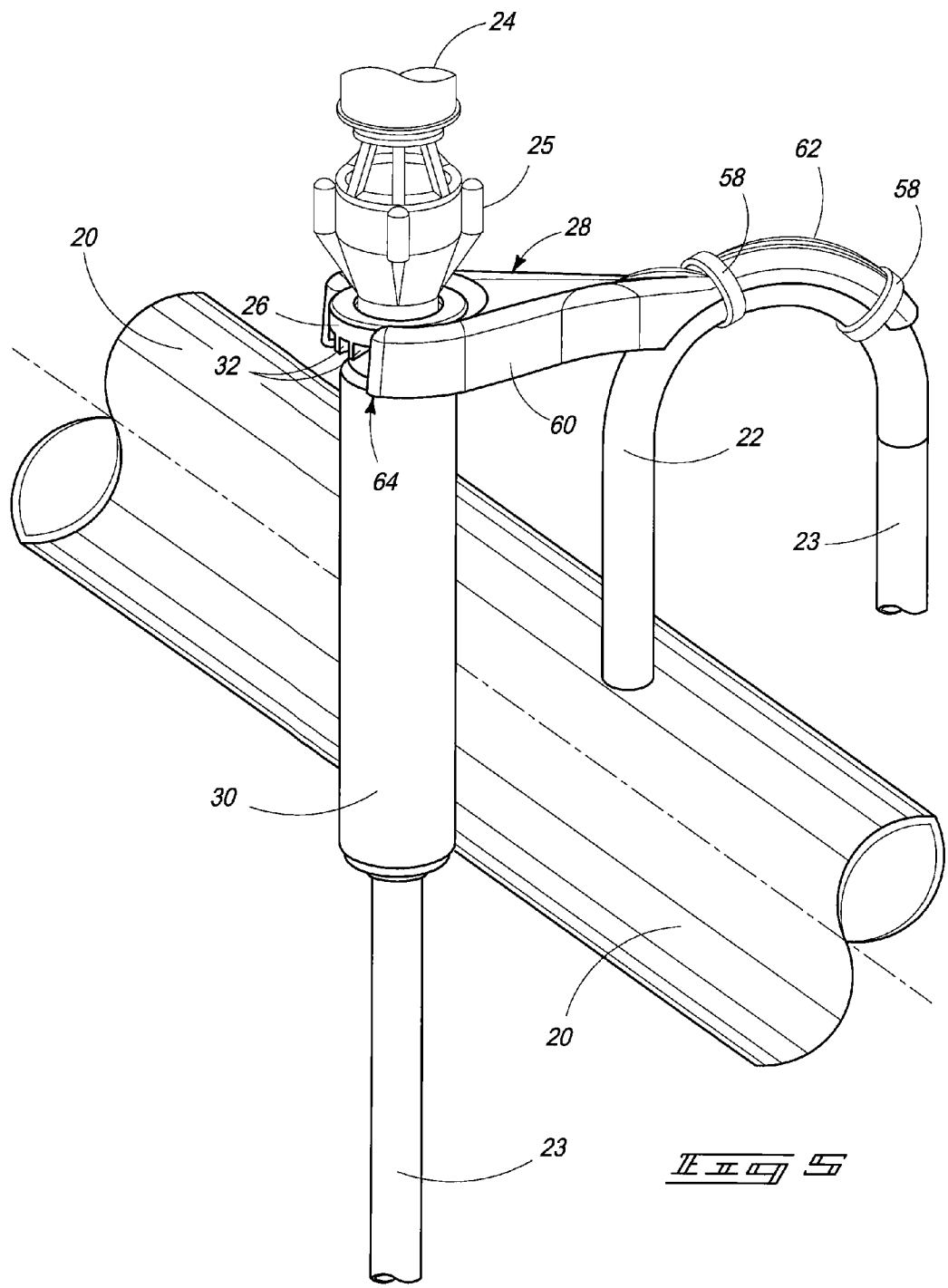

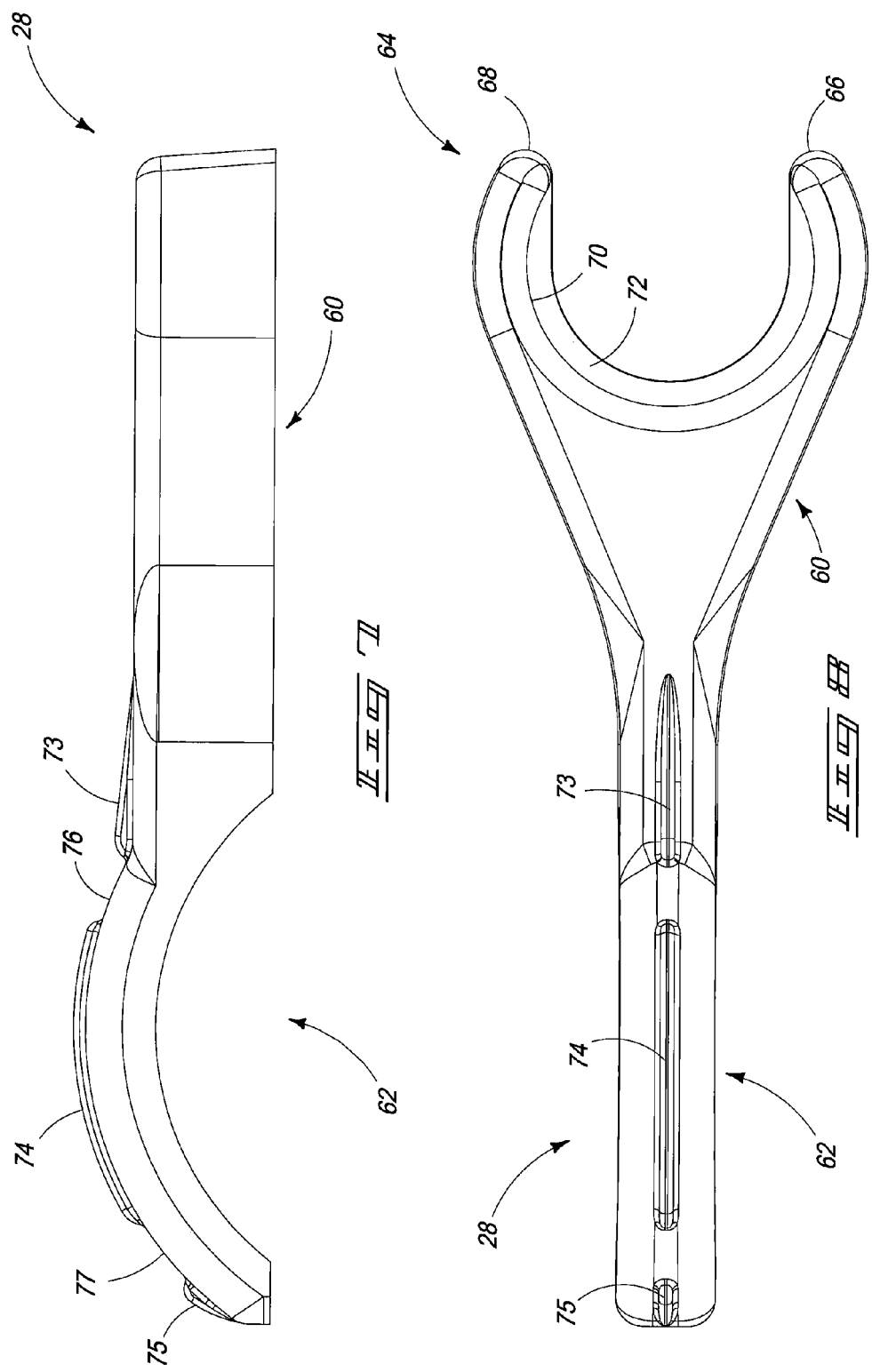

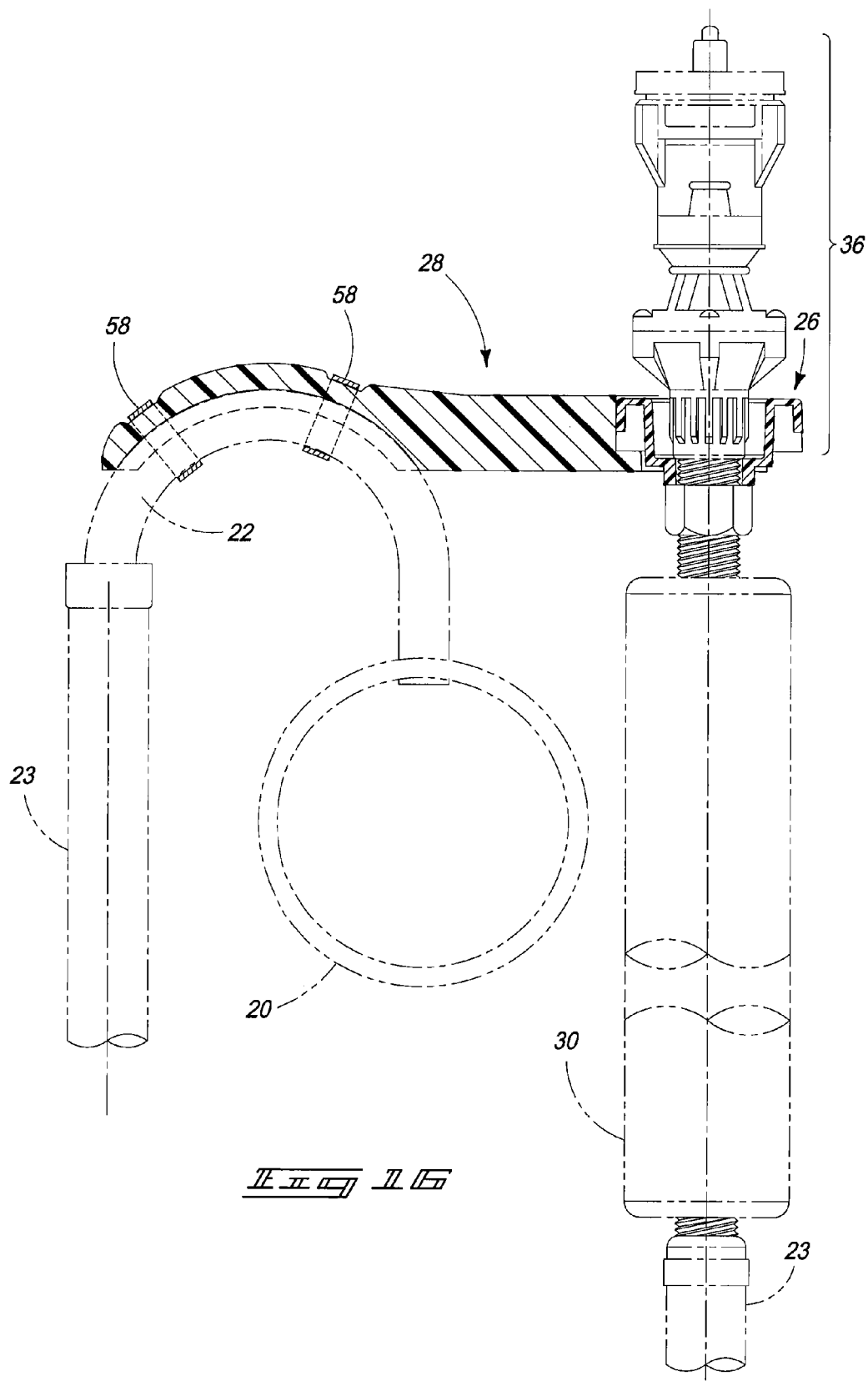

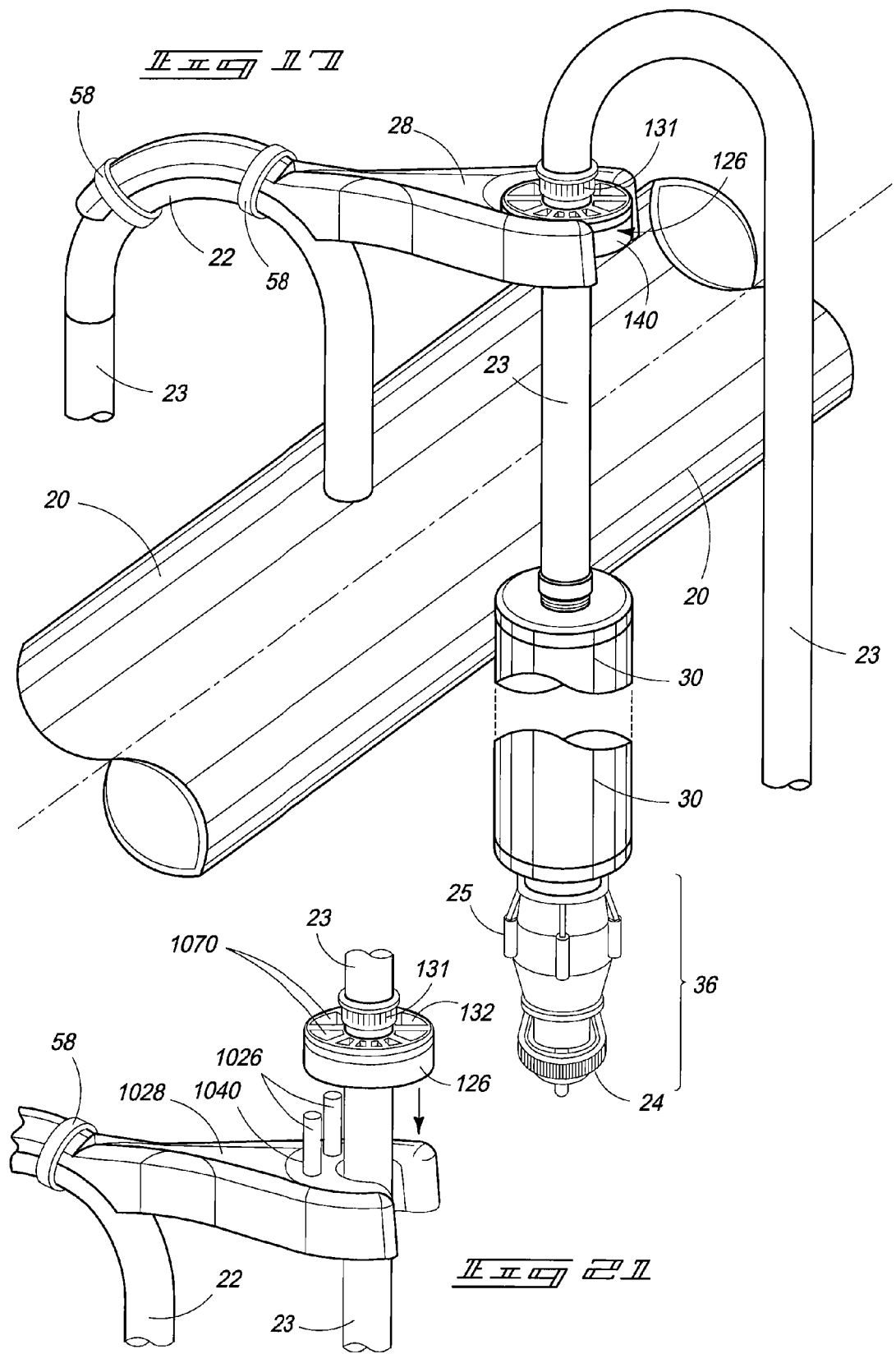

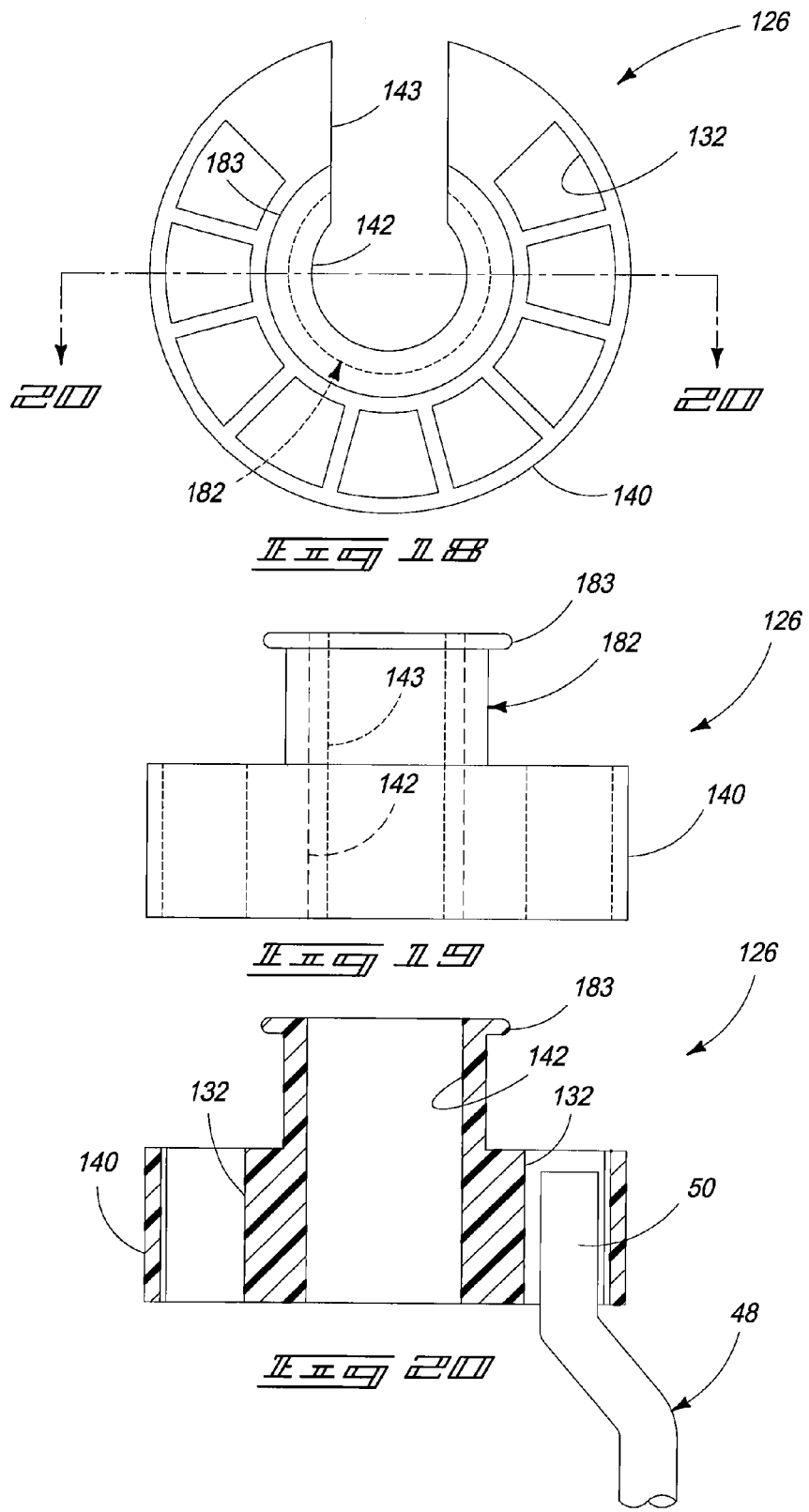

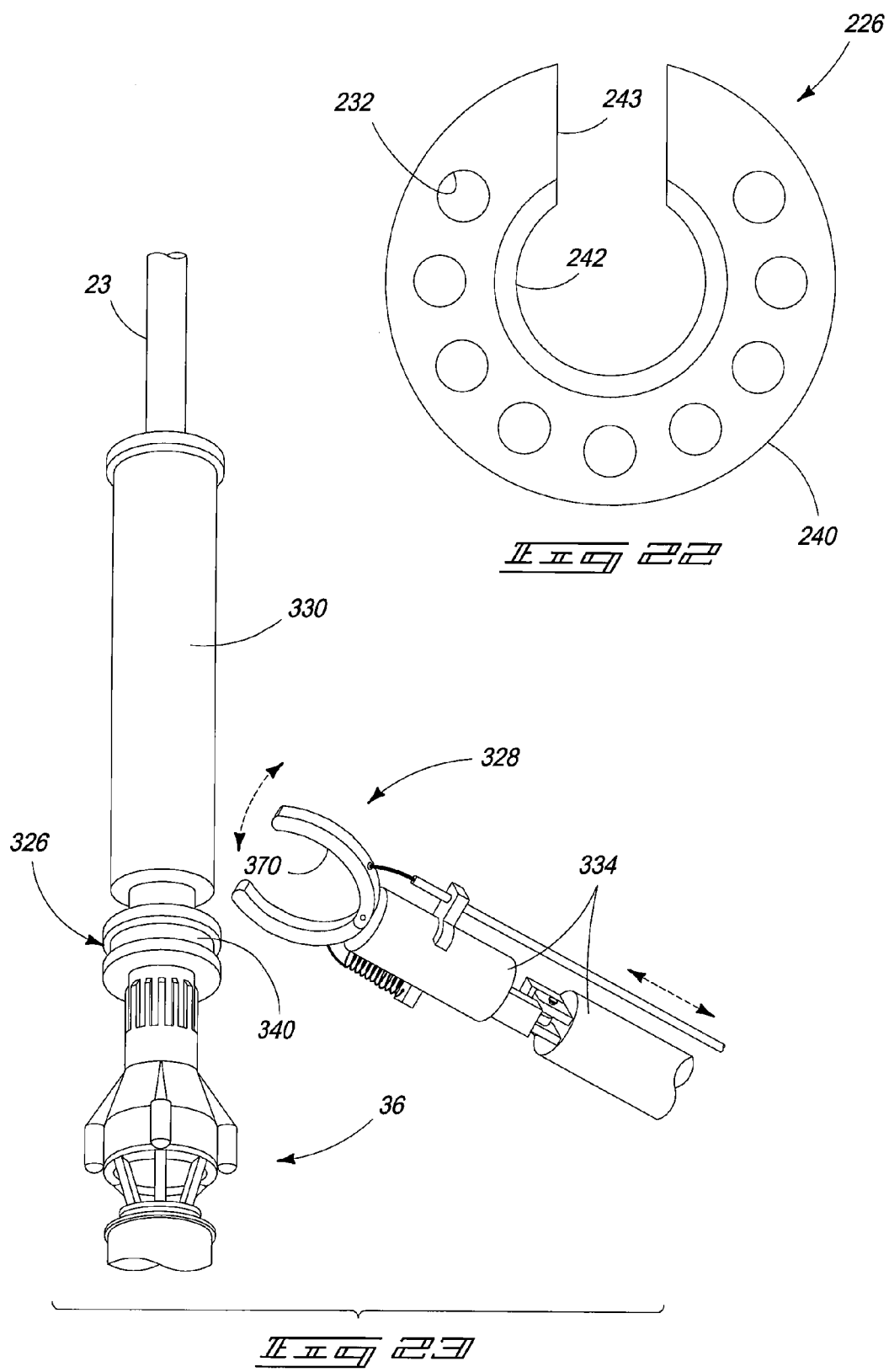

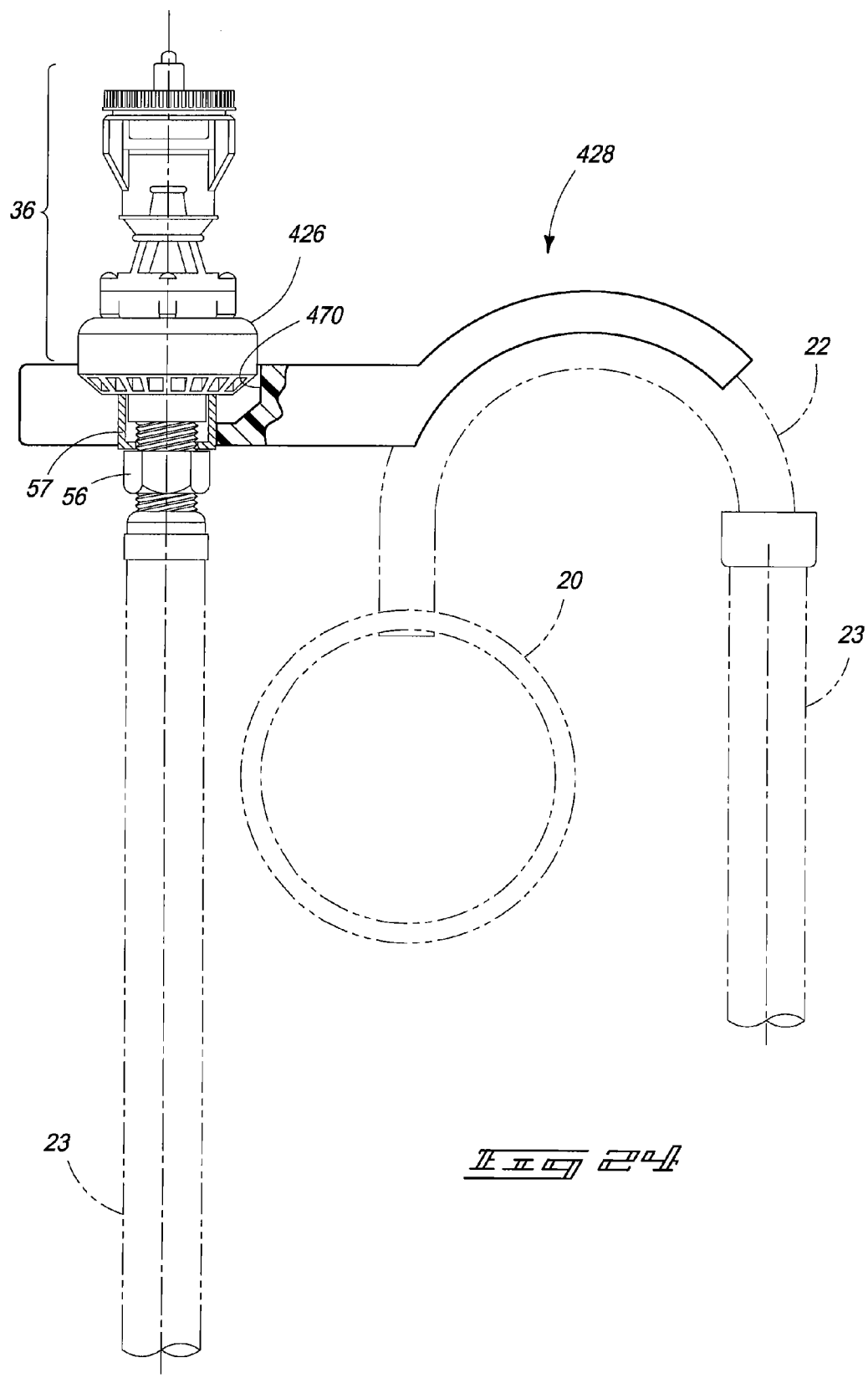

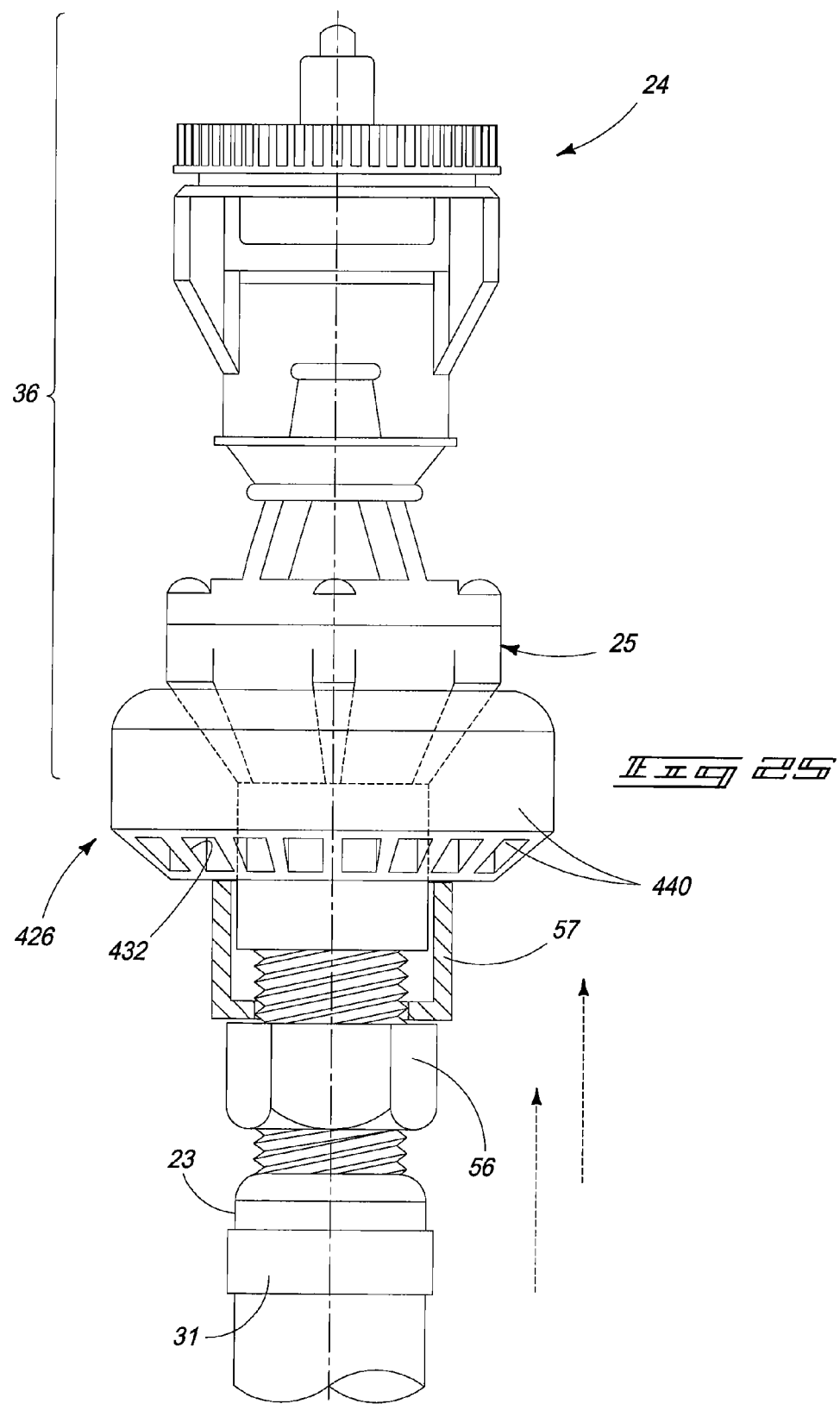

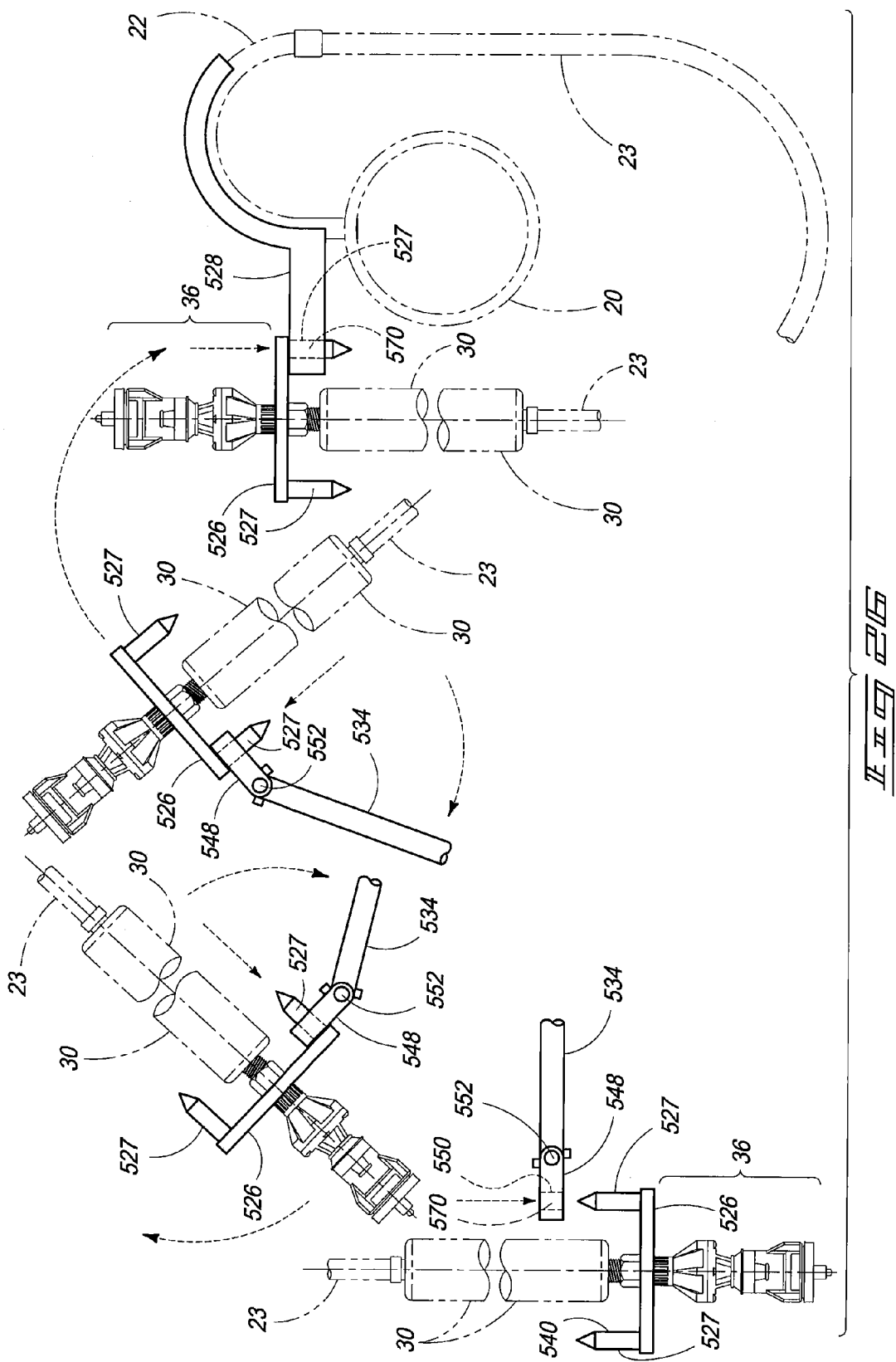

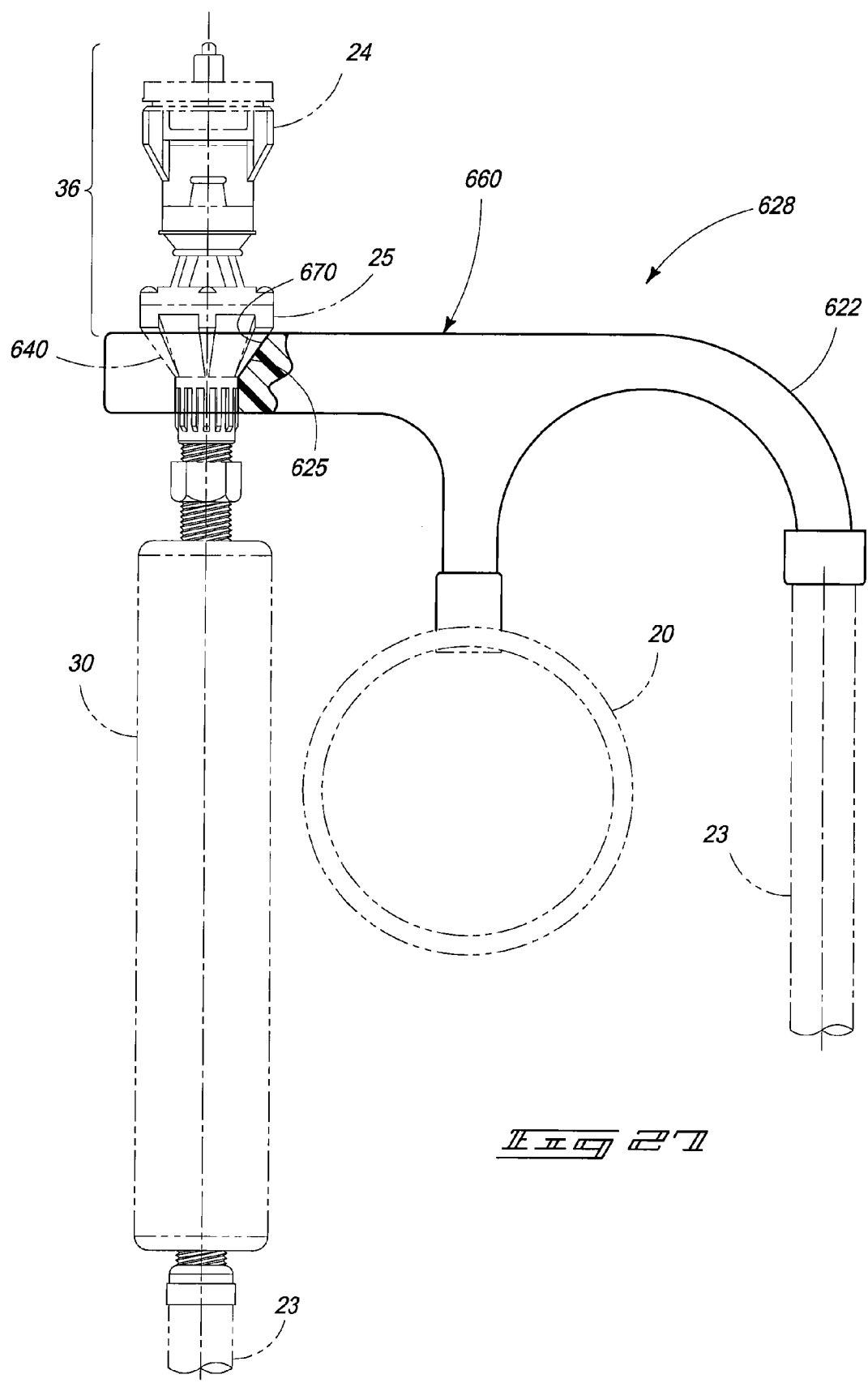

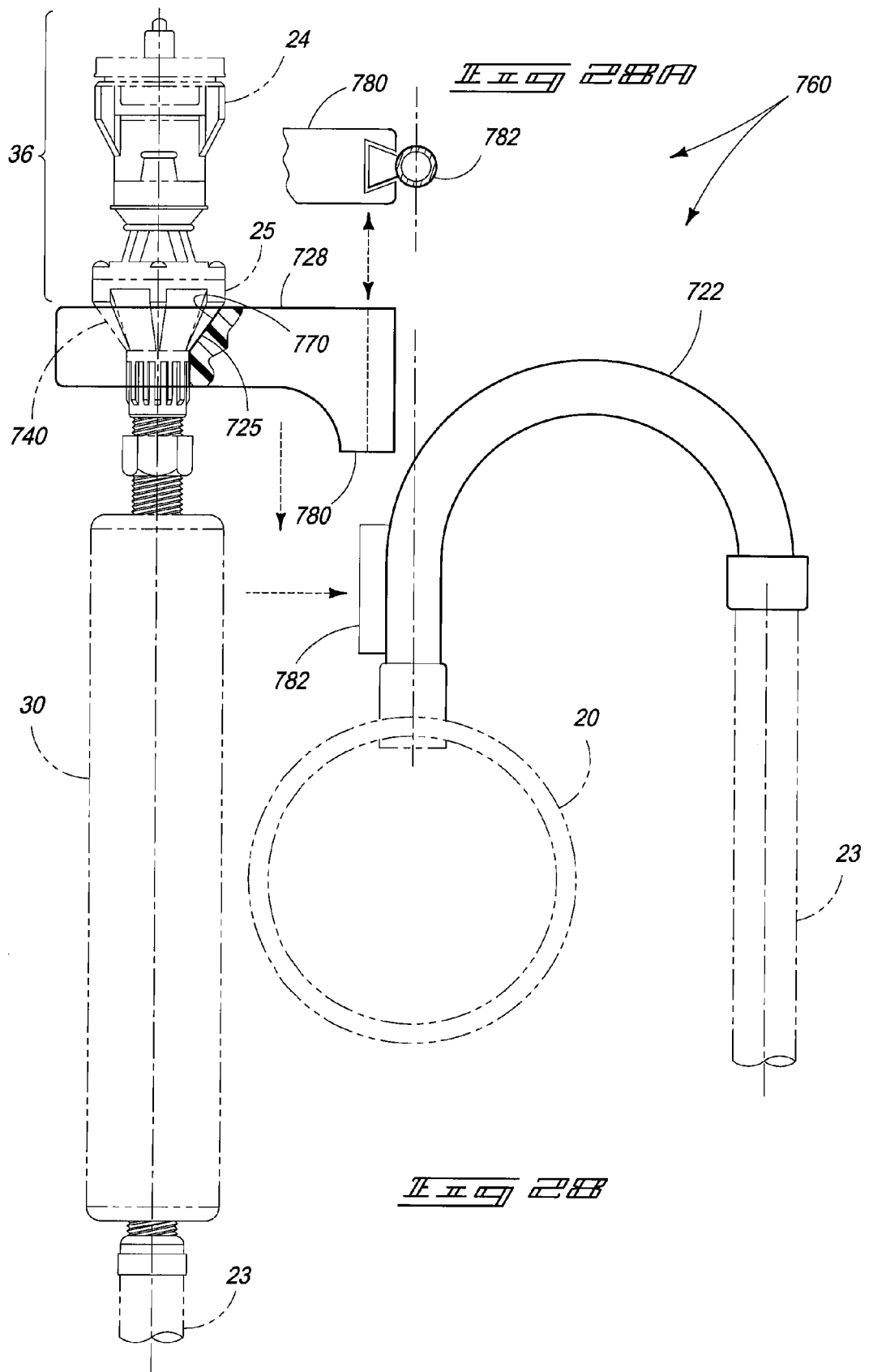

APPARATUS AND METHOD FOR SUPPORTING A FLEXIBLE HOSE SPRINKLER HEAD ON AN ELEVATED IRRIGATION SUPPLY LINE

TECHNICAL FIELD

The present invention pertains to moving irrigation systems. More particularly, the present invention relates to apparatus and methods for elevating sprinkler heads on a moving irrigation system to accommodate changes in crop height during a crop growing cycle.

BACKGROUND OF THE INVENTION

It is previously known to irrigate crops in large fields using either a center pivot or a linear move irrigation device. Originally, these devices had a spaced-apart array of individual sprinklers provided atop a main water supply line that was elevated above a field. Over time, U-shaped horseshoe adapters were added in order to allow attachment of downwardly extending drops made from rigid water lines to which a sprinkler was affixed at a bottom end. However, for crops that grow to relatively tall heights, such as corn, there existed a need to adjust the height of sprinklers.

As shown in FIG. 1, rigid water lines of prior systems were replaced on a center pivot irrigation device 10 with flexible hoses 23 that affixed between the horseshoe 22 and the sprinkler head 36 (see FIG. 2) to form a flexible drop 18. Center pivot irrigation device 10 has a main line, or water pipe 20 that receives a supply of water at a center stand 13 and extends out to a terminal end 16, delivering water to sprinkler/regulator assemblies 36 on a serial array of spans 14 that are each supported between adjacent towers 12 by a pair of wheels 15. A sprinkler weight 30 is provided adjacent each sprinkler/regulator assembly 36 in order to reduce movement of drop 23 due to wind. As crops grow in elevation, the hose 23 is wrapped around the main waterline pipe 20, as shown in FIG. 2, in order to raise the sprinkler head of sprinkler/regulator assembly 36. A worker 11 manipulates each hose about pipe 20 by walking along truss rods 27, which are suspended by adjacent bowstring truss assemblies 21 of the truss 19. Worker 11 also wraps a drop weight 30 and sprinkler/regulator assembly 36 about pipe 20 as hose 23 is wrapped about pipe 20. However, worker 11 can slip and fall from truss rods 27 on the device 10 and get injured when raising and lowering such a sprinkler/regulator assembly 36. Accordingly, a need exists to adjust height of sprinklers on a moving irrigation device 10 without placing a worker 11 at risk of injury from a fall.

SUMMARY OF THE INVENTION

An apparatus and method are provided for raising and lowering sprinklers provided on a moving irrigation device, such as a center pivot or linear move irrigation device. A sprinkler support body and a hanger body are provided for selectively supporting individual sprinklers at raised positions above a traditional drop position. Furthermore, a lifting tool and a sprinkler support body are provided for lifting and lowering the sprinkler on each drop between elevated and lowered, or drop positions. Finally, a method is provided for raising and lowering a sprinkler between the elevated and lowered, or drop positions.

According to one aspect, an adaptive support is provided for a flexible hose sprinkler head on an elevated irrigation supply line that includes a sprinkler support body and a hanger body. The sprinkler support body has a first inter-fitting contact surface. The body is disposed to support a downwardly extending flexible sprinkler hose. The hanger body has a second inter-fitting contact surface configured to mate with the first inter-fitting contact surface. The hanger body is disposed to support the sprinkler body at an elevated position.

According to another aspect, a support is provided for a flexible hose with a sprinkler head of an elevated irrigation supply line. The support includes a sprinkler support body and a hanger body. The sprinkler support body has one of a male member and a female member and an engagement surface configured to mate and demate with a lifting tool. The body is affixed to a downwardly extending flexible sprinkler hose. The hanger body has another of the male member and the female member configured to mate with the one of the male member and the female member. The hanger body is disposed to support the sprinkler body at an elevated position.

According to yet another aspect, a method is provided for changing elevation of a sprinkler head on a flexible hose of an elevated irrigation supply line. The method includes: providing a sprinkler support body communicating with one of the sprinkler head and the hose, a hanger body supported relative to the supply line at an elevated location, and a lifting tool configured to mate and demate with the support body; mating the lifting tool with the support body; and while mated, moving the sprinkler head with the lifting tool between a downwardly depending position beneath the supply line and an elevated position where the sprinkler support body mates with the hanger body.

BRIEF DESCRIPTION OF THE DRAWINGS

Preferred embodiments of the disclosure are described below with reference to the following accompanying drawings.

FIG. 3 is an enlarged partial perspective view illustrating a worker raising an individual flexible hose sprinkler head from ground level using an adaptive sprinkler support body and a lifting tool according to one embodiment.

FIG. 4 is an enlarged partial perspective view of a sprinkler support body and a mating lifting tool aligned to be engaged with the sprinkler support body as it would be positioned if it were mounted to a lowered sprinkler drop prior to lifting a sprinkler to an elevated position.

FIG. 4A is a perspective view of the lifting tool and sprinkler support body of FIG. 4 illustrating engagement of the tool with the body, to begin a process of lifting and pivoting a sprinkler/regulator assembly of a sprinkler drop.

FIG. 4C is a perspective view later in time of the lifting tool and sprinkler support body of FIG. 4B illustrating further lifting and pivoting of the sprinkler/regulator assembly towards an inverted position.

FIG. 5 is a perspective view of the sprinkler/regulator assembly seated in a raised configuration with the body seated atop a hanger body affixed to a drop elbow atop a main span pipe of a center pivot irrigation device.

FIG. 7 is a left elevational view of the hanger body of FIG. 6.

FIG. 8 is a plan view of the hanger body of FIGS. 6-7.

FIG. 16 is a vertical centerline sectional view of the sprinkler support body and hanger body mated together and showing other irrigation components in phantom side view while a sprinkler is supported in an elevated position.

FIG. 17 is an enlarged perspective view of a sprinkler/regulator assembly seated in a raised configuration using an alternate embodiment sprinkler support body seated atop a hanger body affixed to a drop elbow atop a main span pipe of a center pivot irrigation device.

FIG. 18 is a plan view of the sprinkler support body of FIG. 17.

FIG. 19 is a side elevational view of the sprinkler support body of FIG. 17.

FIG. 20 is a vertical centerline sectional view of the sprinkler support body engaged with a lifting tool and taken along line 20-20 of FIG. 18.

FIG. 21 is an enlarged perspective view of a further alternative embodiment sprinkler support body and hanger body over that depicted in FIG. 17.

FIG. 22 is an optional embodiment of the sprinkler support body of FIGS. 17-21.

FIG. 23 is an enlarged perspective view of yet another alternative embodiment sprinkler support body and lifting tool.

FIG. 24 is an enlarged side component view with portions in phantom showing the sprinkler support body of FIG. 24 seated atop a complementary alternative embodiment sprinkler hanger body.

FIG. 25 is an enlarged side component view showing another alternative embodiment sprinkler support body.

FIG. 26 is a series montage of a sprinkler support body, sprinkler hanger body, and lifting tool according to yet another embodiment showing successive positioning over time during a lifting operation.

FIG. 27 is an enlarged side view of a single piece sprinkler hanger body and gooseneck according to even another embodiment.

FIG. 28 is an enlarged side view of a two-piece variation of the sprinkler hanger and gooseneck of FIG. 27.

DETAILED DESCRIPTION OF THE PREFERRED EMBODIMENTS

Figure 1:
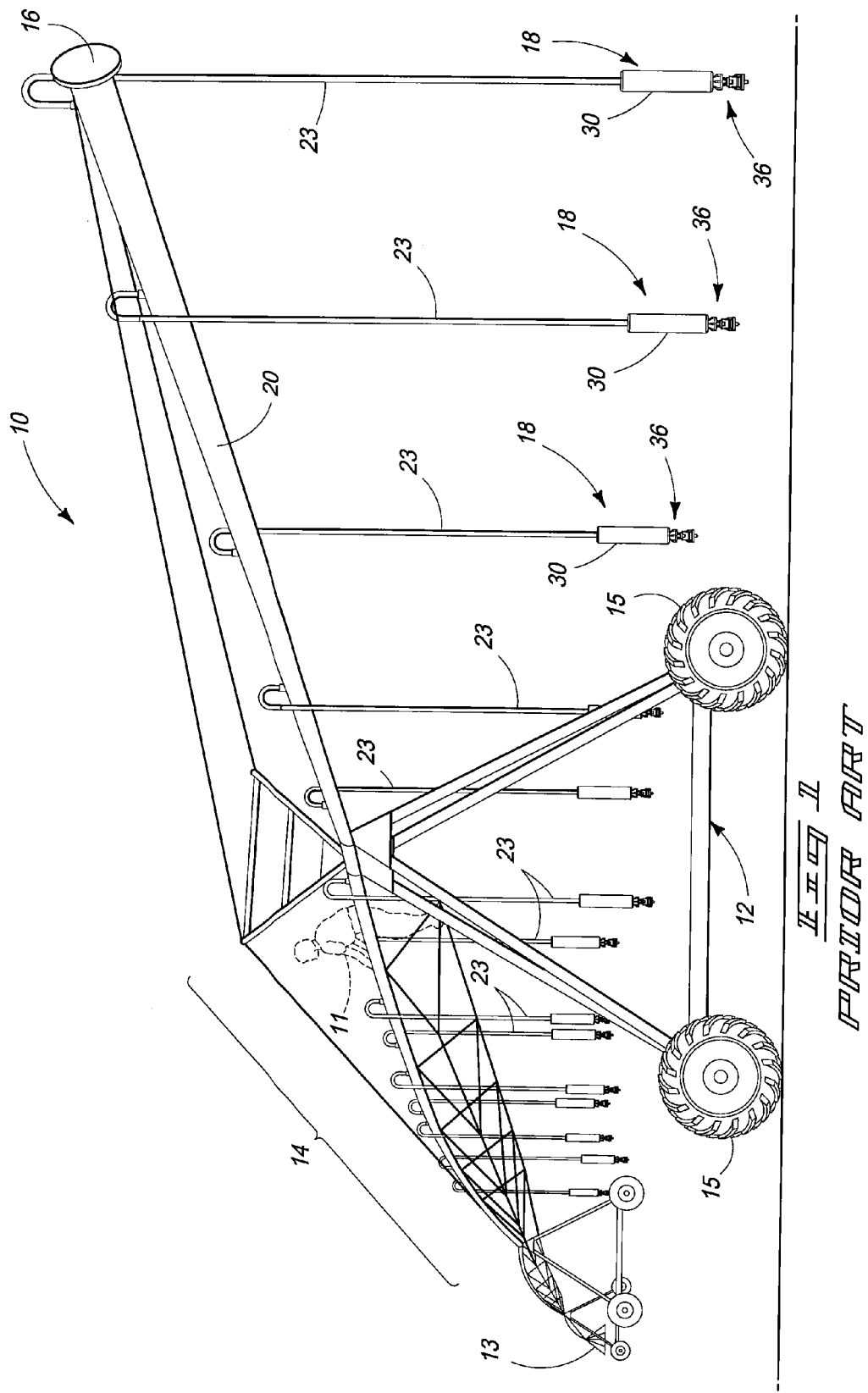
FIG. 1 is a simplified perspective view of a center pivot irrigation device having an array of prior art flexible hose sprinkler heads.
Figure 2:
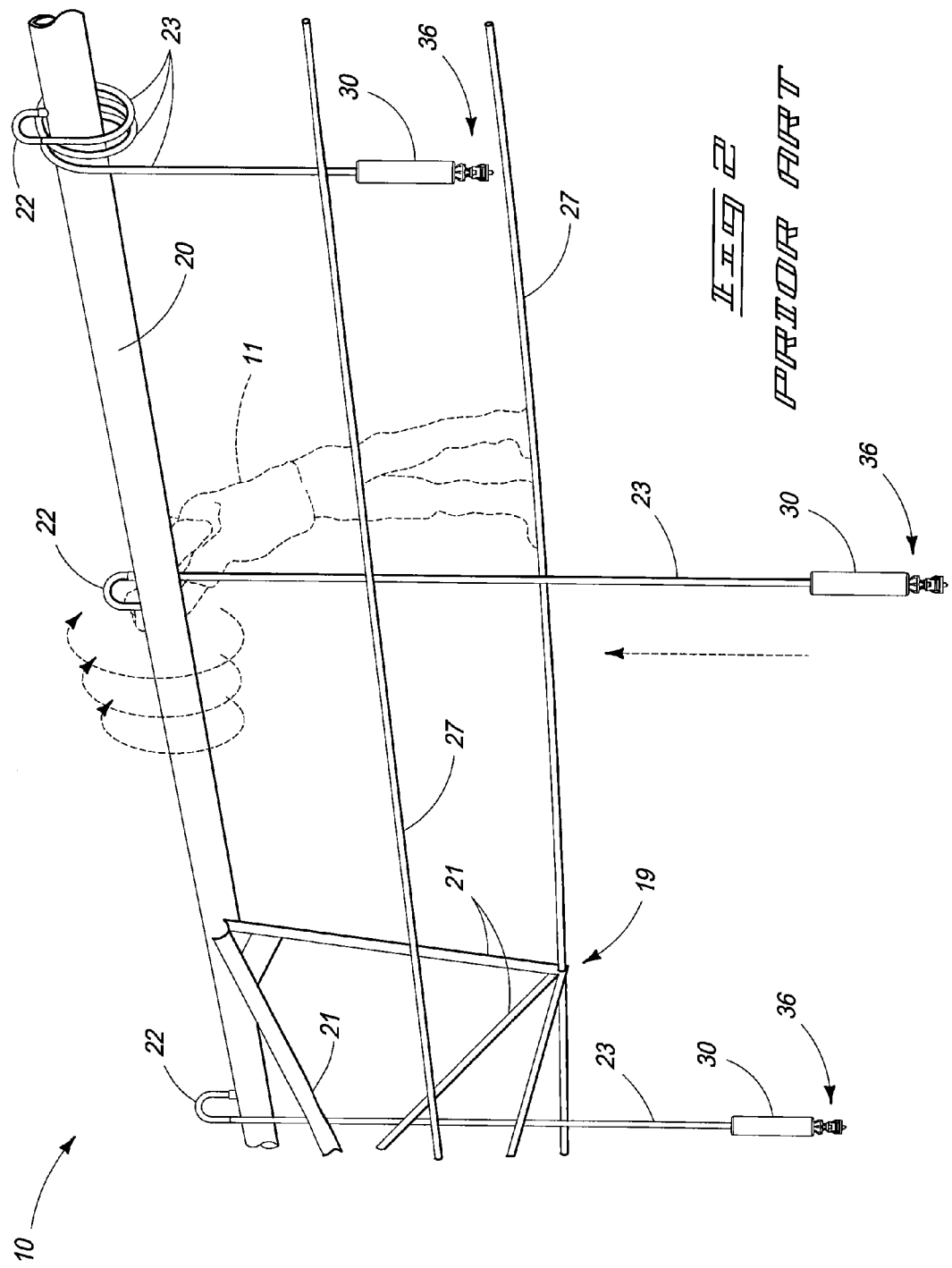
FIG. 2 is an enlarged partial perspective view of the irrigation device of FIG. 1, illustrating a prior art technique with a worker raising an individual flexible hose sprinkler head above a growing crop to accommodate crop growth.

This disclosure is submitted in furtherance of the constitutional purposes of the U.S. Patent Laws "to promote the progress of science and useful arts" (Article 1, Section 8).

FIG. 3 illustrates a sprinkler/regulator assembly 36 on a flexible hose drop, or hose 23 being raised atop a main water line, or pipe 20 of a center pivot irrigation device 10, according to one embodiment. FIGS. 3-16 illustrate construction and use of this embodiment. It is understood that the same implementation can be used to raise and lower a sprinker/regulator assembly on a hose drop relative to a linear move irrigation device.

As shown in FIG. 3, a worker 11 is depicted raising one of a series of sprinkler/regulator assemblies 36 on a downwardly hanging flexible hose drop 23 of a center pivot irrigation device 10 using a lifting tool 34 while worker 11 remains at ground level. During use, lifting tool 34 mates and demates with a sprinkler support body, or puck 26. Sprinkler support body 26 is mounted rigidly between sprinkler/regulator assembly 36 and a sprinkler weight 30, as will be described below in greater detail with reference to FIGS. 4A-4D. Early in a crop growth cycle, such as for corn crops, hose drop 23 hangs down adjacent the crop. As the crop grows in height, raising the potential to interrupt water distribution from each sprinkler 24, worker 11 raises each sprinkler 24 individually using lifting tool 34 while worker 11 remains at ground level. In this manner, worker 11 avoids the need to climb up a ladder, or climb onto truss rods 27 of truss 19 on device 10.

In order to hold each sprinkler 24 at an elevated position, lifting tool 34 is used to elevate sprinkler/regulator assembly 36 and accompanying hose drop 23 for engagement with a hanger body 28 that is supported on a gooseneck, or horseshoe pipe 22 extending from atop main water line, or pipe 20 of device 10. Likewise, tool 34 is used to engage with sprinkler support body 26 at the end of a growing season in order to lower each sprinkler 24.

FIG. 4 illustrates the positioning of lifting tool 34 prior to engaging with sprinkler support body 26, but with sprinkler drop components omitted, and prior to lifting a sprinkler to an elevated position. More particularly, lifting tool 34 includes an elongate handle, or pole 35, a wire form fork 48, and a hose clamp 52. Fork 48 is formed from a folded over section of cylindrical wire rod that is bent along a length to form a pair of substantially parallel wire form fingers, or tines 50 spaced laterally from a central axis of the folded over section of the rod so as to provide an offset of fingers 50. Optionally, fork 48 can be affixed directly onto handle 35 by welding or being embedded in an epoxy-filled aperture in the end of handle 35.

Fingers 50 each provide a male engagement surface 51 that mates and demates with a female engagement surface 53. According to this construction, surface 51 and surface 53 are not completely complementary surfaces, but provide sufficient mating contact to provide stable support of fingers 50 within apertures 32 sufficient to raise and lower a sprinkler/regulator assembly. Optionally, the male and female surfaces can be complementary, such as shown in the embodiment depicted in FIG. 22, where the male surface is cylindrical and the female surface is a completely complementary, cylindrical surface. Further optionally, a single finger can be mated and demated with a single aperture. Even further optionally, a male surface can be provided by the sprinkler support body and the female surface can be provided by the lifting tool, such as shown in the embodiment depicted in FIG. 21. In the embodiment depicted in FIG. 21, the female surface on the sprinkler support body mates and demates with both the lifting tool and the support bracket.

As shown in FIG. 4A, a tool 34 is provided for manipulating position of a sprinkler 24 on a hose drop of an irrigation device. A sprinkler support body 26 is physically coupled directly or indirectly to the sprinkler 24. The sprinkler support body 26 has a portion 42 configured to mate with a component of a sprinkler drop for supporting a sprinkler 24 at an elevated position and a lifting tool contact portion 32. The lifting tool 34 has an elongate handle 35 and an engagement member 50 depending from the handle with a contact surface 51 (see FIG. 4) that inter-fits with the body contact surface 32 when raising and lowering a sprinkler 24.

As shown in FIG. 5, a lifting support body 26 is provided for a flexible line drop sprinkler 24. Body 26 comprises a toroidal sprinkler support body having a portion 40 (see FIG. 4) configured to secure to a component 28 (see FIG. 5) of a sprinkler drop and having a lifting tool aperture 32 for receiving a lifting tool 34 for raising and lowering a sprinkler 24 (see FIG. 5).

Fingers 50 of tool 34 are spaced apart laterally to match corresponding adjacent L-shaped holes, or apertures 32 provided in a radial array within sprinkler support body 26. As shown in FIG. 4, body 26 takes on the shape of a cylindrical puck 38 having a cylindrical outer contact surface 40. Puck 38 has a pair of progressively smaller cylindrical outer contact surfaces 44 and 46. A reduced diameter bore 42 extends into puck 38 within contact surface 46.

FIGS. 4A-4D depict progressive steps involved when mating together lifting tool 34 and sprinkler support body 26 in order to raise sprinkler/regulator assembly 36, sprinkler weight 30, and flexible hose 23 of a sprinkler drop to an elevated position. Body 26 is rigidly secured between a sprinkler weight 30 and a sprinkler/regulator assembly 36. Optionally, body 26 can be integrally formed from weight 30 or regulator 25. Further optionally, body 26 can take on any of a number of shapes that enable a lifting tool to engage with and disengage from the body to enable raising and lowering of a sprinkler and hose drop. Such further optional configurations also include any shape that provides a contact surface that inter-fits, or mates with another contact surface on a hanger body atop a main water line of an irrigation device. Such interfitting configurations of male and female members can be exactly, or completely complementary, or they can be roughly complementary sufficient to support raising and lowering of a sprinkler and related components on a sprinkler drop.

Figure 4B:
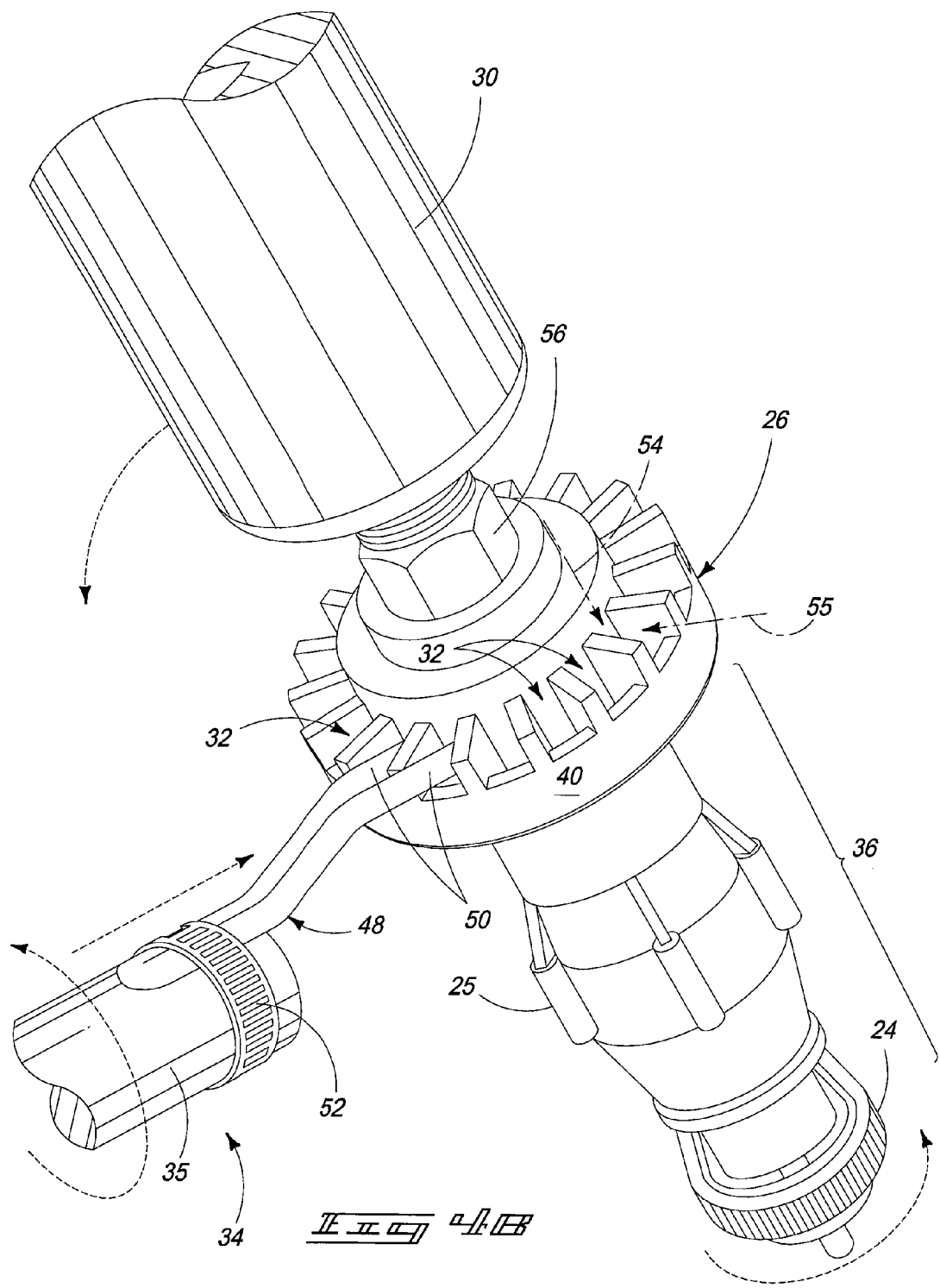
FIG. 4B is a perspective view later in time of the lifting tool and sprinkler support body of FIG. 4A illustrating forward and upward engagement of the tool with the body while lifting and pivoting the sprinkler/regulator assembly as a sprinkler drop begins to pendulum in an upward direction.

As shown in FIG. 4A, tool 34 is moved forward to insert fingers 50 within a radially extending portion 55 of each L-shaped aperture 32 for a downwardly hanging sprinkler hose drop. Fingers 50 function to stabilize sprinkler/regulator assembly 36 and weight 30 as tool 34 is used to push sprinkler/regulator assembly 36 and weight 30 forward and upward as suspended at the end of hose 23 like a pendulum. In this manner, sprinkler 24 is swung upwardly at the end of the respective hose drop, as shown progressively in FIGS. 4B-4D. As sprinkler/regulator assembly 36 approaches a horizontal position, fingers 50 insert further into axial portions 54 of apertures 32, enabling upside-down seating of sprinkler support body 26, weight 30, and sprinkler/regulator assembly 36.

As shown in FIG. 4A, body 26 is rigidly secured to regulator 25 with one end of a double threaded end pipe nut fitting (a nipple with a medial nut) 56. An opposite end of fitting 56 threads into a complementary threaded end of weight 30. Both ends of fitting 56 self-seal with weight 30 and regulator 25, respectively. Water is delivered from a main line, through a flexible hose drop, through weight 30 and regulator 25 for dispersal from sprinkler 24.

As shown in FIG. 4B, tool 34 is pushed forward, causing sprinkler/regulator assembly 36 and weight 30 to rotate upwardly at the end of the respective hose of a sprinkler drop (not shown). Fingers 50 begin to pivot within axial portion 54 of each L-shaped aperture 32 as assembly 36 and weight 30 rotate and pivot upwardly.

As shown in FIG. 4C, fingers 50 have slid into full axial engagement within axial portion 54 of each L-shaped aperture 32. The flexible hose (see FIG. 5) of the sprinkler drop flexes and pivots much like a pendulum while tool 34 acts against body 26, weight 30 and assembly 36.

Figure 4D:
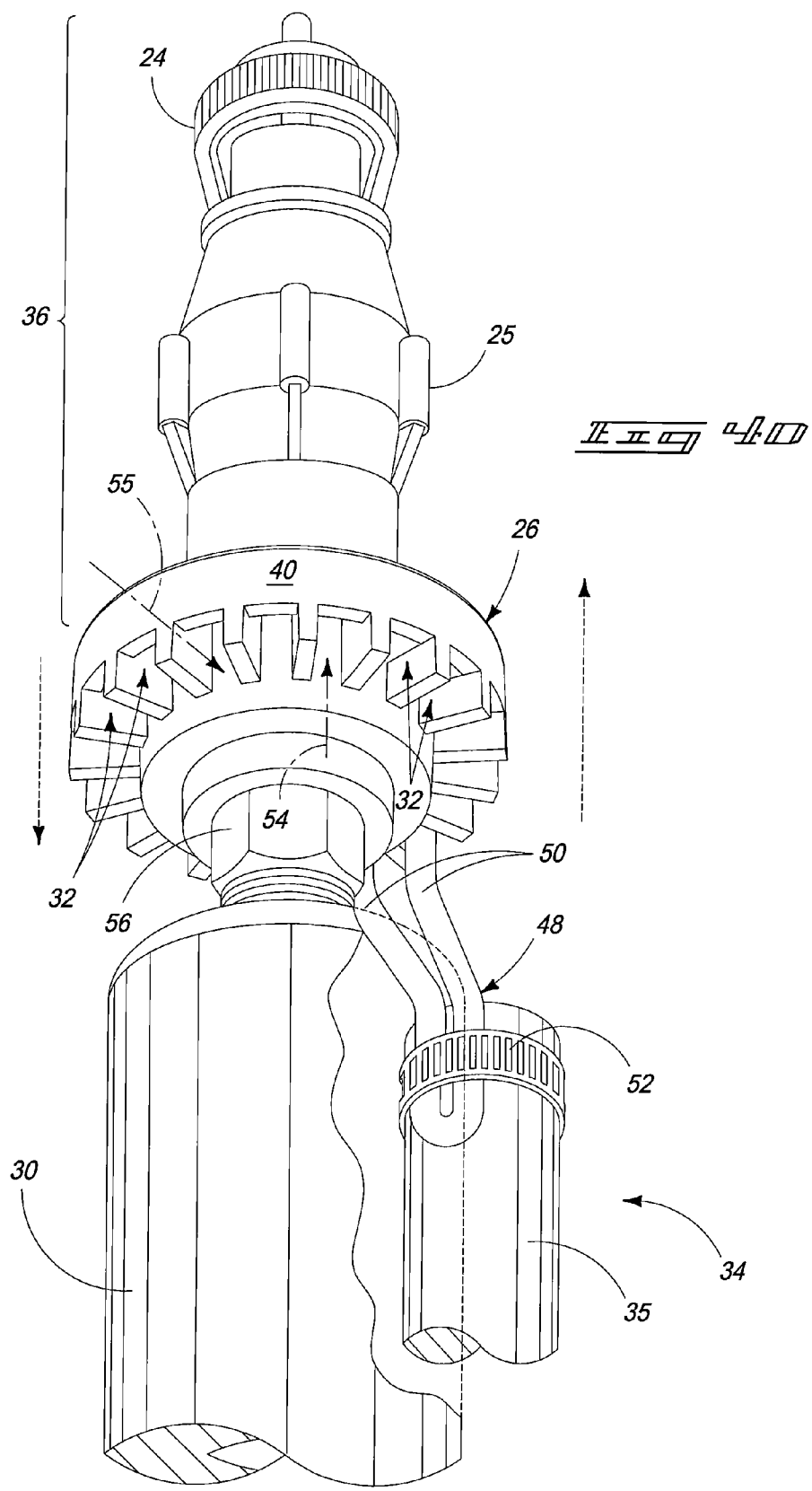
FIG. 4D is a perspective view later in time of the lifting tool and sprinkler support of FIG. 4C illustrating the body and sprinkler/regulator assembly completely inverted and seated atop the tool and being raised to an elevated position.

As shown in FIG. 4D, fingers 50 mate in interfitting engagement within respective axial portions 54 of apertures 32 so as to stably support sprinkler/regulator assembly 36 and weight 30 in an upside down configuration. In this upside down configuration, a worker can raise sprinkler/regulator assembly 36 and weight 30 while tool 34 is engaged with sprinkler support body 26 in order to mate body 26 with hanger body 28 (see FIG. 5). The upside down configuration shown in FIG. 4D corresponds with that depicted in FIG. 3 as a worker 11 raises sprinkler 24 upwardly where body 26 is mated in inter-fitting engagement with a corresponding hanger body atop main line 20.

As shown in FIGS. 4A-4D and 5, sprinkler support body 26 and hanger body 28 provide an adaptive support for a flexible hose sprinkler head on an elevated irrigation supply line. The sprinkler support body 28 has a first inter-fitting contact surface. The sprinkler support body 28 is disposed to support a downwardly extending flexible sprinkler hose. The hanger body 28 has a second inter-fitting contact surface configured to mate with the first inter-fitting contact surface. The hanger body 28 is disposed to support the sprinkler body at an elevated position.

FIG. 5 illustrates sprinkler 24 positioned in an elevated location after sprinkler support body 26 has been dropped into mating engagement with hanger body 28, thereby supporting sprinkler 24, regulator 25, weight 30, and hose 23. More particularly, sprinkler support body 26 is disposed to support flexible sprinkler hose 23 while in this elevated location. Hose 30 is bent, or curved upwardly from a normal downwardly hanging drop position. When water is delivered through hose 23, hose 23 has a tendency to straighten out, but sprinkler support body 26 mates in complementary relation with a yoke 64 on hanger body 28 that prevents rotation of body 26 (and sprinkler 24). Yoke 64 forms a mouth that exposes several apertures 32, which enables insertion and removal of fingers 50 on tool 34 (see FIGS. 4A-4D).

As shown in FIG. 5, sprinkler support body 26 and hanger body 28 cooperate to provide an adaptive support for a sprinkler head 24 on a terminal end of a flexible drop hose 23 on an elevated irrigation water supply line 20 of an irrigation device. Hose 23 is affixed with threads (not shown) onto a U-shaped pipe, or gooseneck 22 atop line 20. A curved clamp arm 62 on hanger body 28 is affixed atop U-shaped pipe 22 using a pair of hose clamps 58. In this configuration, yoke 64 is supported outwardly from gooseneck 22 via an extended arm 60. This ensures that hose 23 clears along an opposite side of pipe 20 than from the downwardly extending end of gooseneck 22.

As illustrated in FIGS. 3-5, a method is provided for changing elevation of a sprinkler head on a flexible hose of an elevated irrigation supply line. The method includes: providing a sprinkler support body communicating with one of the sprinkler head and the hose, a hanger body supported relative to the supply line at an elevated location, and a lifting tool configured to mate and demate with the support body; mating the lifting tool with the support body; and while mated, moving the sprinkler head with the lifting tool between a downwardly depending position beneath the supply line and an elevated position where the sprinkler support body mates with the hanger body.

Figure 6:
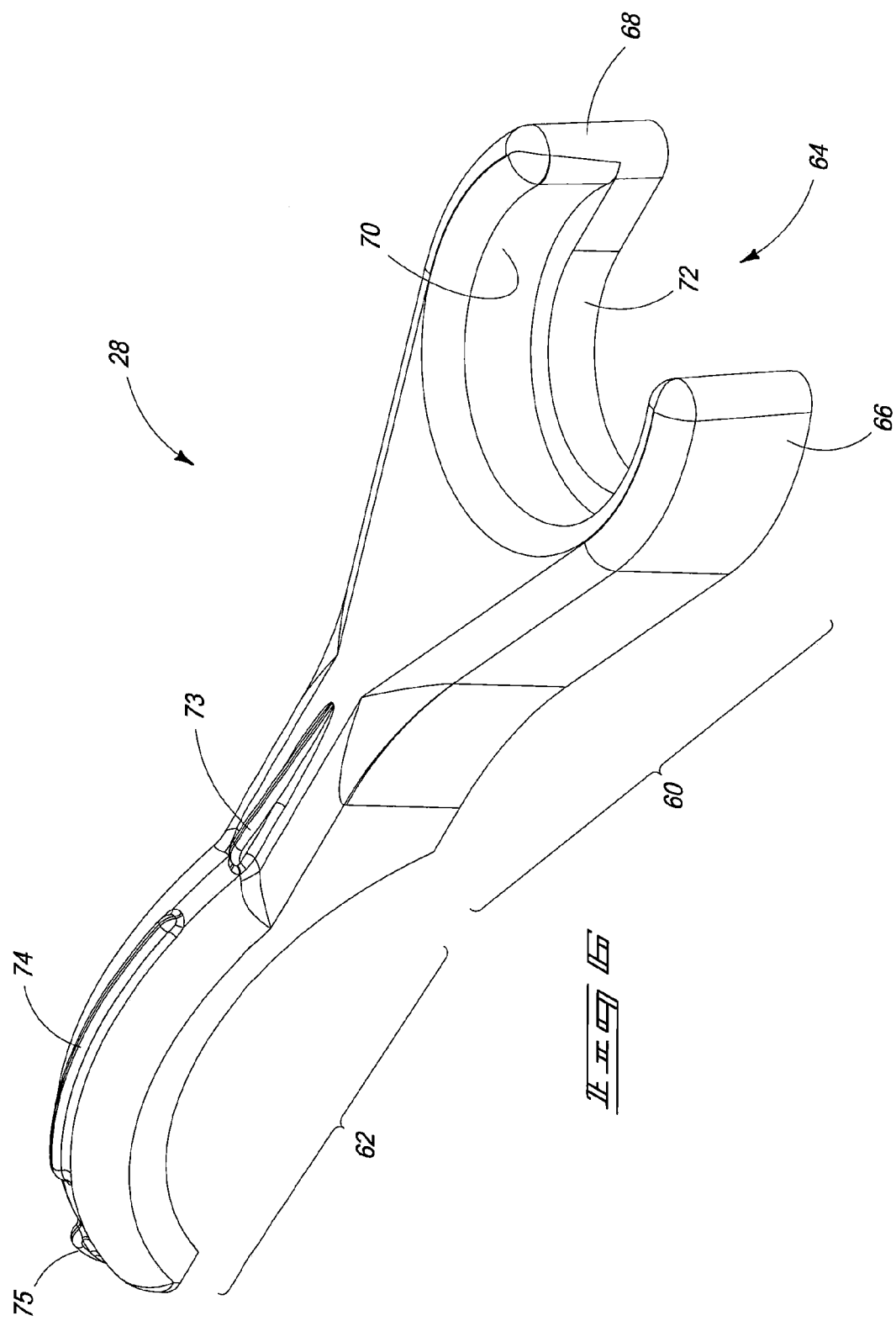
FIG. 6 is an enlarged perspective view of the hanger body of FIGS. 3 and 5.

FIGS. 6-10 illustrate one embodiment for hanger body 28. As shown in FIG. 6, yoke 64 on arm 60 forms a pair of arms 66 and 68 that subtend greater than a semicircle and provide a vertically extending female contact surface 70. A radially inwardly extending shelf 72 is provided beneath surface 70 by yoke 64. A series of elevated, elongate enforcing ribs 73-75 are intermittently spaced apart atop clamp arm 62 with space provided there between to accommodate hose clamps 58 (see FIG. 5).

FIGS. 7 and 8 further illustrate spaced apart configuration of ribs 73-75 on body 28 so as to provide hose clamp gaps 76 and 77 (see FIG. 7) along arm 62. Additionally, the manner in which arms 66 and 68 extend greater than a semi-circle is shown in FIG. 8, thereby ensuring that a corresponding male cylindrical outer contact surface 40 on sprinkler support body 26 mates in complementary engagement with female cylindrical contact surface 70. Shelf 72 forms a seat beneath body 26 when received in mating engagement within surface 70.

Figure 9:
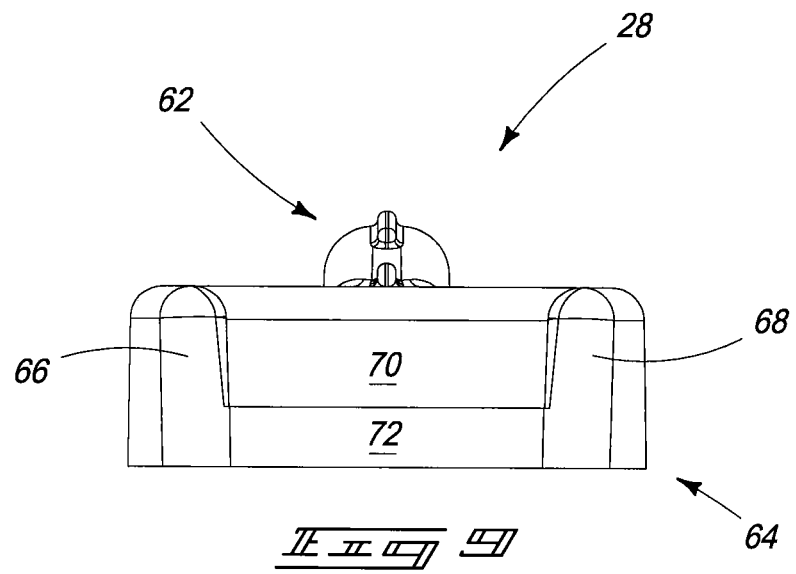
FIG. 9 is a front end elevational view of the hanger body of FIGS. 6-8.
Figure 10:
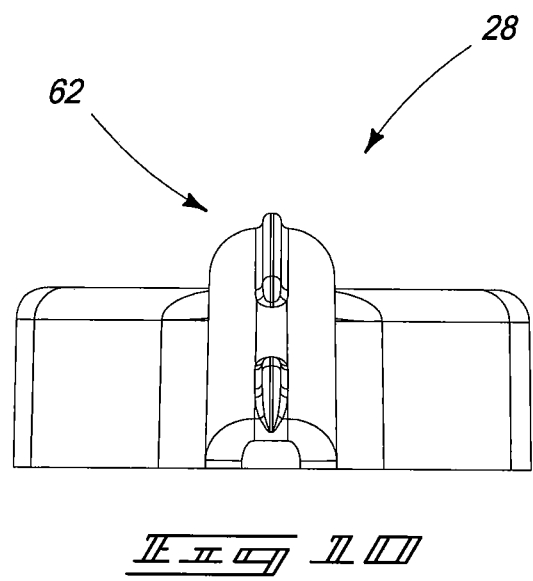
FIG. 10 is a rear end elevational view of the hanger body of FIGS. 6-9.

FIG. 9 illustrates in front end view female cylindrical contact surface 70 and shelf 72 of body 28, as provided by arms 66 and 68 of yoke 64. Furthermore, FIGS. 9 and 10 show curved clamp arm 62 in front and rear end views, respectively.

FIGS. 11-15 illustrate one embodiment for sprinkler support body 26. More particularly, body 26 is formed in the shape of a cylindrical puck having a pair of central through bores 42 and 43. Bores 42 and 43 are coincident with a central axis of body 26, and extend completely through body 26 from a top surface 80 to a bottom surface 81. Bore 42 has a smaller diameter than bore 43.

Figure 11:
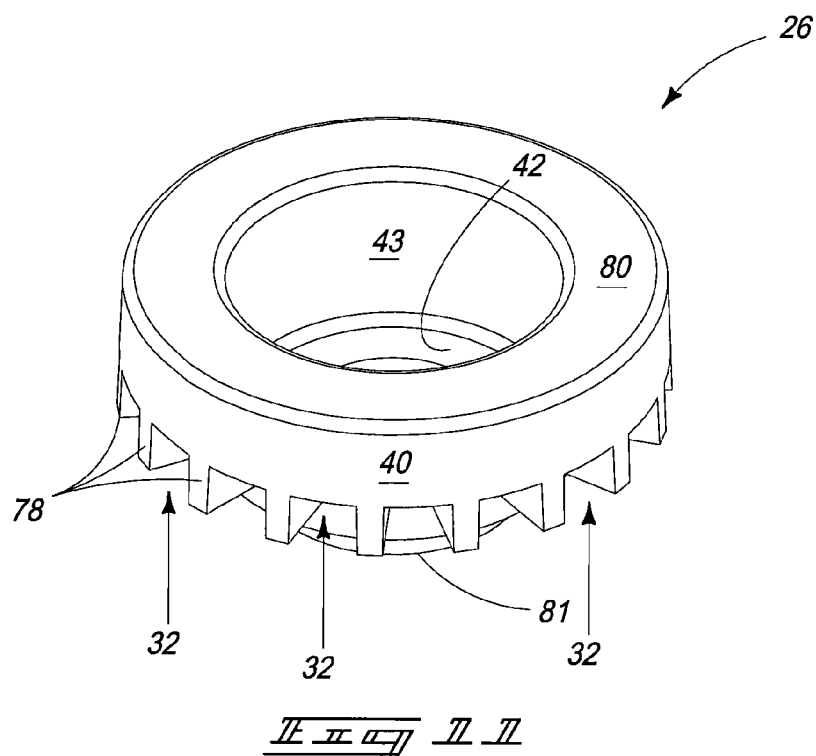
FIG. 11 is a perspective view from above of the sprinkler support body of FIGS. 3-5.
Figure 12:
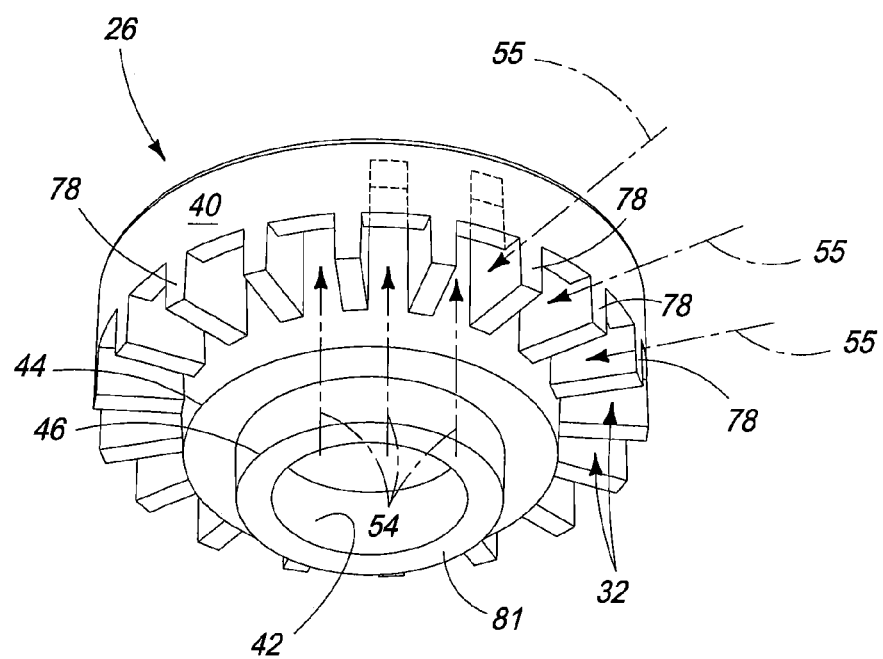
FIG. 12 is a perspective view from below of the sprinkler support body of FIG. 11.
Figure 13:
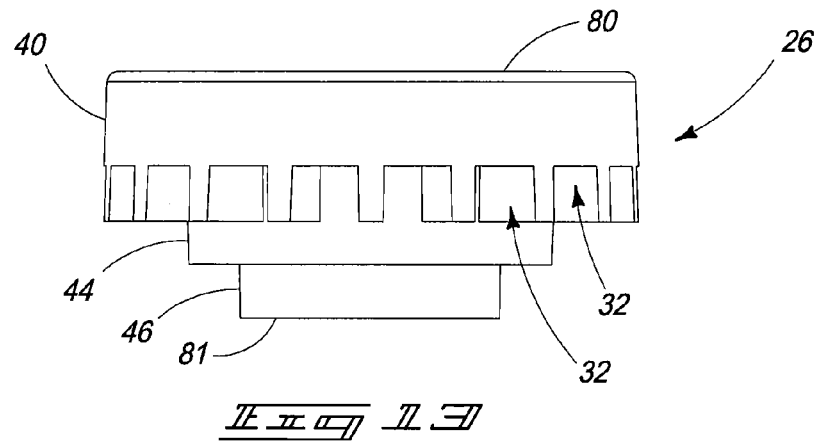
FIG. 13 is a side elevational view of the sprinkler support body of FIGS. 11-12.

As shown in FIGS. 11 and 12, a circumferential array of L-shaped apertures 32 are provided about body 26, each aperture 32 communicating with outer surface 40 for receiving fingers 50 of tool 34 (see FIGS. 4A-4D). A circumferential array of radially extending ribs 78 form contiguously with outer surface 40 so as to define apertures 32. Depending downwardly from outer surface 40 are a pair of radially reduced diameter cylindrical segments 44 and 46. As shown in FIG. 13, segment 44 of body 26 provides for partial passage of a regulator through body 26 (see FIG. 16), while surface 40 seats with yoke 26. Segment 46 provides a washer surface, or abutment against which a bottom edge of the regulator is seated (see FIG. 16). As shown in FIG. 12, each L-shaped aperture 32 comprises an axial portion 54 and a radial portion 55.

Figure 14:
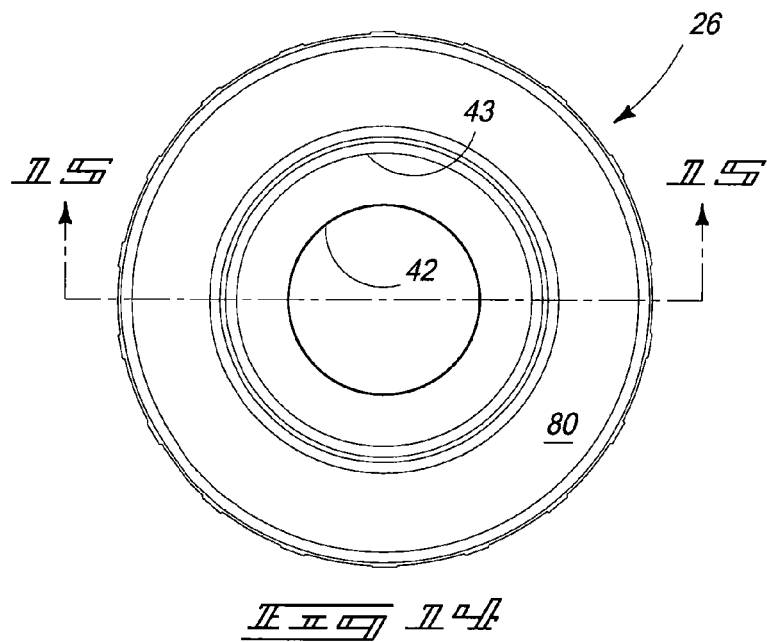
FIG. 14 is a plan view of the sprinkler support body of FIGS. 11-13.
Figure 15:
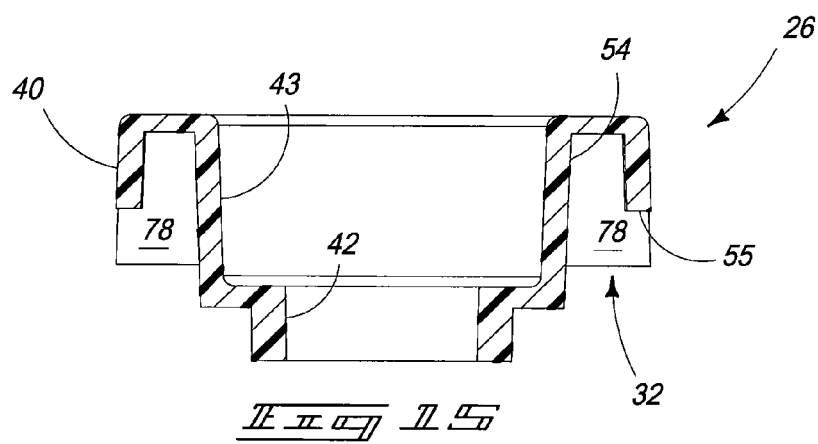
FIG. 15 is a centerline sectional view of the sprinkler support body of FIGS. 11-14 taken along line 15-15 of FIG. 14.

FIGS. 14 and 15 depict the coaxial positioning of bores 42 and 43 within body 26. Bore 42 provides for passage of a double threaded pipe nut fitting 56 (see FIGS. 4A-4D). Furthermore, surface 40 and radial outer edges of ribs 78 mate as inter-fitting contact surfaces with complementary surface 70 of hanger body 70 (of FIG. 6).

FIG. 16 illustrates sprinkler support body 26 mated in inter-fitting contact with hanger body 28 to support sprinkler/regulator assembly 36 at an elevated position atop main water line 20. Hanger body 28 and sprinkler support body 26 are shown in centerline sectional view with certain irrigation device components shown in phantom, such as gooseneck 22, hose 23, main line 20, and weight 30. Hose clamps 58 secure body 28 atop gooseneck 22. Optionally, body 28 can be secured to gooseneck 22 with U-bolts, muffler clamps, interconnecting members, or any other type of suitable fastener. Further optionally, body 26 and body 28 can be integrally formed together, as shown below with reference to FIG. 27.

As shown in the embodiment depicted in FIGS. 3-16, sprinkler 24 is an R3000 Rotator, sold by Nelson Irrigation Corporation, 848 Airport Road, Walla Walla, Wash. 99362. Furthermore, regulator 25 is a Nelson Universal Pressure Regulator, sold by Nelson Irrigation Corporation, 848 Airport Road, Walla Walla, Wash. 99362.

FIGS. 17-20 illustrate one alternative embodiment adaptive support for a flexible hose sprinkler head using an alternatively constructed sprinkler support body 126 that mounts at a desired location along a medial portion of flexible hose drop 23 (see FIG. 17) using a hose clamp 131. As shown in FIG. 17, sprinkler support body 126 is lifted up in a manner similar to that depicted in FIGS. 4 and 4A-4D, but body 126 is not inverted upside down in the process. As shown in FIG. 20, body 126 is raised using fork 48 on tool 34 (see FIG. 4) by inserting fingers 50 into corresponding apertures 132 in the bottom of body 126 and raising body 126 upwardly for mating with hanger body 28 (see FIG. 17) atop gooseneck 22 on main water line 20. Hose drop 23 is flexible and accommodates this raised orientation by forming a U-shaped bend upstream of body 126. Sprinkler weight 30, regulator 25 and sprinkler 24 hang downwardly from body 126 in this raised configuration, in a manner similar to how they hang in a normal lowered configuration from gooseneck 22.

As shown in FIG. 18, sprinkler support body 126 has an inner cylindrical bore 142 sized to receive a hose drop 23 (see FIG. 17) and a narrowed slot 143 through which hose drop 23 is press-fit during assembly. A hose clamp 131 (see FIG. 17) is then affixed about an integrally formed collar 182 (see FIG. 18) in order to further secure body 126 at a selected location onto a hose drop. Trapezoidal apertures 132 are sized to receive fingers 50 of tool 34 (see FIG. 4). Cylindrical outer diameter surface 140 provides a mating, or inter-fitting contact surface that mates in complementary engagement with contact surface 70 on hanger 28 (see FIG. 6).

As shown in FIG. 19, collar 182 of body 126 has a reduced diameter between cylindrical end flange 183 and a base diameter forming cylindrical outer contact surface 140. This reduced diameter helps retain a hose clamp in position about collar 182.

FIG. 20 illustrates sprinkler support body 26 in centerline sectional view with a finger 50 of fork 48 (on tool 34, of FIG. 4) received in engagement within aperture 132 while lifting and lowering a sprinkler from hanger body 28 (of FIG. 17). In this manner, fingers 50 mate and demate with apertures 132 when lifting and lowering a sprinkler head.

FIG. 21 depicts an alternative construction for a sprinkler hanger body 1028 over that shown in FIG. 17. More particularly, hanger body 1028 includes a pair of pins 1026 that extend upwardly from a yoke end of body 1028. Hanger body 1028 envelopes hose drop 23 adjacent to pins 1026, as sprinkler support body 126 is lowered with tool 34 (not shown, see FIG. 4) onto pins 1026 and a top surface of body 1028. According to this construction, apertures 132 form a contact surface for mating with an outer contact surface of each pin on tool 34 (see FIG. 4). Apertures 132 also each form a female contact surface 1070 for mating with a male contact surface 1040 on each pin 1026. Surfaces 1040 and 1070 provide first and second inter-fitting contact surfaces that serve to support a sprinkler body at an elevated position.

FIG. 22 depicts another alternative construction for a sprinkler support body 226 having cylindrical apertures 232 over that shown in the embodiment depicted in FIGS. 17-20. Fingers 50 on tool 34 (see FIG. 4) are sized to mate and demate with apertures 232 when raising and lowering a sprinkler.

FIG. 23 depicts yet another alternative embodiment adaptive support for a flexible hose sprinkler head with a sprinkler support body 326 that mates and demates with a hanger body (not shown) similar to hanger body 28 (of FIG. 5). A radial outer surface of body 326 is received in mating complementary relation with surface 70 on hanger body 28 (see FIGS. 5 and 6). A circumferential groove 340 about body 326 is sized to mate in complementary relation with an inner surface 370 of an articulating claw 328 provided on an elongate tool arm 334. Jaw portion 328 is opened, then closed about inner surface 370 to grab and raise body 326 when raising sprinkler/regulator 36 to an elevated position atop a main water line of an irrigation device. Similarly, jaw portion 328 is engaged around body 326 in order to retrieve and lower a sprinkler/regulator 36 from such a raised position. Jaw portion 328 has a pair of opposed jaw surfaces 370 that are geared together (not shown) so as to open and close in opposed, identical pivotal positions, with a spring tending to hold the jaws open and a flexible cable routed in a flexible plastic tube used to work against the spring so as to open up the jaws prior to griping groove 340.

FIGS. 24 and 25 illustrate even another alternative embodiment adaptive support for a flexible hose sprinkler head with a sprinkler support body 426 that is formed by machining a radial array of apertures 432 (see FIG. 25) into a one pound weight for flexible drops currently sold by Nelson Irrigation Corporation, 848 Airport Road, Walla Walla, Wash. 99362. Optionally, a single pair of adjacent apertures can be formed in body 426 in a configuration that receives fingers on a lifting tool (similar to fingers 50 on tool 24 of FIGS. 4A-4D). Body 426 has a radial outer surface 440 that mates in complementary relation with a female surface 470 provided on a hanger body 428. Hanger body 428 is otherwise similar to hanger body 28 of FIG. 6, save for the modified female surface 470.

As shown in FIG. 25, a cup-shaped washer 57 is inserted between nut 56 and regulator 25 and serves to urge body 426 into frustoconical engagement with a tapered outer surface of regulator 25.

FIG. 26 illustrates yet even another alternative embodiment adaptive support for a flexible hose sprinkler head with a sprinkler support body 528 having a female contact surface 570 provided by a hanger body 528 that mates and demates with a male contact surface 540 on a pin 527 on a sprinkler support body 526. Surface 540 is also designed to mate and demate with a lifting tool 534.

As shown in FIG. 26, sprinkler support body 526 is made from a square plate that supports a rectangular array of four cylindrical pins 527. As shown in FIG. 26, only two pins in the foreground are visible and it is understood that there is a corresponding pin behind each pin shown in the foreground. Likewise, bores 527 and 550 each have another bore hidden behind the labeled bore such that pairs of complementary mating pins and bores are provided for mating and demating. Each pin 527 has a cylindrical contact surface that mates, or inter-fits with a complementary cylindrical contact surface 570 provided by a pair of bores 527 in a hanger body 528. Furthermore, two of the cylindrical contact surfaces 540 on a pair of pins 527 are configured and sized to mate and demate with a complementary cylindrical contact surface provided by a pair of bores 550 formed in an end fitting 548 on a lifting tool 534. Tool 534 has an elongate handle similar to tool 34 of FIG. 3. However, tool 534 also has a pivot pin that helps facilitate rotation of end fitting 548 when inverting base 526 as a sprinkler/regulator assembly 36 is raised and inverted, as shown in the various photomontage images depicted in FIG. 26. A pair of square stops are provide on each of end fitting 548 and handle of tool 534 in order to limit rotation of end fitting 548 relative to the tool handle. Tool 534 is used to raise and lower sprinkler/regulator assembly 36 relative to hanger body 528 atop gooseneck 22 of main water line 20 of an irrigation device.

FIG. 27 illustrates yet another alternative embodiment adaptive support for a flexible hose sprinkler head with a sprinkler support body 640 that is provided by a frustoconical male outer surface 625 on regulator 25 and a complementary frustoconical female outer surface 670 provided by a yoke on a hanger body 628. Hanger body 628 is integrally formed with a gooseneck 622 to provide a unitary hanger body/gooseneck assembly 660. Assembly 660 delivers water to drop hose 23 via gooseneck 622 and supports a sprinkler/regulator assembly 36 and weight 30 atop hanger body 628. Hanger body 628 is similar to hanger body 28 (of FIG. 6) with respect to the yoke.

FIG. 28 illustrates yet another alternative embodiment adaptive support for a flexible hose sprinkler head with a sprinkler support body 740 that is provided by a frustoconical male outer surface 725 on regulator 25 and a complementary frustoconical female outer surface 770 provided by a yoke on a hanger body 728. Hanger body 728 is removably mated to gooseneck 722 with interlocking dovetail members 780 and 782, respectively, as shown further in FIG. 28A, to provide a two-piece hanger body/gooseneck assembly 760.

It is understood that an adaptive support can be provided with a sprinkler support body and a hanger body where one of the members has a hook or pin with a male contact surface and the other has a hole or funnel receptacle with a complementary female contact surface. It is further understood that any structure on the sprinkler support body and any structure on the hanger body that provides a pair of inter-fitting contact surfaces can be provided for holding a sprinkler at an elevated location above a field of crops. Likewise, any tool that has an engagement, or mating surface that can be mated and demated with a complementary surface on a component of a sprinkler/regulator/weight assembly can also be used to lift and drop a sprinkler.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect. The invention is, therefore, claimed in any of its forms or modifications within the proper scope of the appended claims appropriately interpreted in accordance with the doctrine of equivalents.

The invention claimed is:

1. An adaptive support for a flexible hose sprinkler head on an elevated irrigation supply line, comprising:
    a sprinkler support body having a first inter-fitting contact surface, the body disposed to support a downwardly extending flexible sprinkler hose;
    a hanger body having a second inter-fitting contact surface configured to mate with the first inter-fitting contact surface, the body disposed to support the sprinkler body at an elevated position; and
    a lifting tool having an engagement surface configured to mate with a corresponding engagement surface on the sprinkler support body.

2. The support of claim 1, wherein the lifting tool has a forked pair of tines and the sprinkler support body has a circumferential array of apertures each configured to receive one of the tines.

3. The support of claim 2, wherein each of the tines comprises a cylindrical wire form member.

4. The support of claim 1, wherein the engagement surface on the sprinkler support body comprises a female segment and the hanger body comprises a male segment.

5. The support of claim 4, wherein the sprinkler support body comprises a cylindrical puck and the hanger body comprises a yoke provided on a distal end and having at least one pin extending vertically above the yoke, the yoke configured to envelope the flexible hose adjacent the cylindrical puck.

6. The support of claim 5, wherein the puck includes a circumferential array of apertures extending through a cylindrical profile of the puck.

7. The support of claim 6, wherein each aperture comprises a trapezoidal aperture.

8. The support of claim 6, wherein each aperture comprises a cylindrical aperture.

9. The support of claim 1, wherein the first inter-fitting contact surface of the sprinkler support body comprises a radial outer surface and the second inter-fitting contact surface of the hanger body comprises a complementary surface configured to engage the radial outer surface and support the sprinkler support body at an elevated position.

10. The support of claim 1, wherein the sprinkler support body comprises a cylindrical puck having a circumferential groove and the lifting tool comprises a tool arm having a claw with a pair of opposed surfaces with at least one surface articulated relative to another surface and configured to engage and disengage with the circumferential groove to raise and lower the sprinkler support body relative to the hanger body.

11. The support of claim 1, further comprising a tool arm having a claw with a pair of opposed articulating jaws configured to engage and disengage with the male segment of the sprinkler support body and operative to raise and lower the sprinkler support body relative to the hanger body.

12. The support of claim 1, wherein the sprinkler support body is provided by a sprinkler weight having a plurality of apertures formed therein configured to receive complementary pins on a lifting tool for raising and lowering the support body and sprinkler relative to the hanger body.

13. The support of claim 1, wherein the sprinkler support body comprises a plate affixed relative to the sprinkler head and having a plurality of pins extending from the plate, the second inter-fitting contact surface of the hanger body comprising at least one female contact surface provided in the hanger body sized to receive a respective pin of the sprinkler support body.

14. The support of claim 1, further comprising a lifting tool having an end fitting with at least one female contact surface configured to receive a respective another pin of the sprinkler support body for raising and lowering the sprinkler support body and sprinkler.

15. The support of claim 1, wherein the sprinkler support body is provided by a sprinkler regulator having a frustoconical male outer surface and the first inter-fitting sprinkler contact surface of the hanger body provides a complementary frustoconical female surface on a yoke of the hanger body.

16. The support of claim 1, wherein the hanger body is provided by a unitary hanger body and gooseneck assembly.

17. The support of claim 1, wherein the hanger body is configured to be removably mated and demated from a gooseneck.

18. A support for a flexible hose with a sprinkler head of an elevated irrigation supply line, comprising:
a sprinkler support body having one of a male member and a female member and a bore providing an engagement surface configured to mate and demate with a lifting tool, the body affixed to a downwardly extending flexible sprinkler hose;
a hanger body having another of the male member and the female member configured to mate with the one of the male member and the female member, the body disposed to support the sprinkler body at an elevated position; and
an elongate arm and a finger disposed at a distal end of the arm and sized to mate and demate with the bore.

19. A support for a flexible hose with a sprinkler head of an elevated irrigation supply line, comprising:
a sprinkler support body having one of a male member and a female member and an engagement surface configured to mate and demate with a lifting tool, the body affixed to a downwardly extending flexible sprinkler hose;
a hanger body having another of the male member and the female member configured to mate with the one of the male member and the female member, the body disposed to support the sprinkler body at an elevated position; and
a lifting tool having an engagement surface configured to mate with the engagement surface on the sprinkler support body.

20. The support of claim 19, wherein the engagement surface on the lifting tool is provided by a cylindrical pin.

21. The support of claim 20, wherein the lifting tool engagement surface is provided by an outer surface of a wire formed fork.

22. The support of claim 21, wherein the fork comprises a pair of S shaped fingers.

23. A method for changing elevation of a sprinkler head on a flexible hose of an elevated irrigation supply line, comprising:
providing a sprinkler support body communicating with one of the sprinkler head and the hose, a hanger body supported relative to the supply line at an elevated location, and a lifting tool configured to mate and demate with the support body;
mating the lifting tool with the support body; and
while mated, moving the sprinkler head with the lifting tool between a downwardly depending position beneath the supply line and an elevated position where the sprinkler support body mates with the hanger body.

24. The method of claim 23, further comprising, after moving the sprinkler head, demating the lifting tool from the support body.

25. The method of claim 23, wherein moving comprises raising the sprinkler head from a downwardly depending position to an elevated position supported by the hanger body.

26. The method of claim 23, wherein moving comprises demating the sprinkler head from the hanger body and lowering the sprinkler head from the elevated position to the downwardly depending position.

27. The method of claim 23, wherein the sprinkler support body comprises a puck having a cylindrical outer surface providing a male member and the hanger body comprises a yoke having a complementary inner surface providing a female member for removably receiving the puck.

28. An adaptive support for a flexible hose sprinkler head on an elevated irrigation supply line, comprising:
a sprinkler support body configured to be affixed to one of: a) the flexible hose and b) the sprinkler head and having a first inter-fitting contact surface comprising a female segment, the body disposed to support a downwardly extending flexible sprinkler hose that has been raised to an elevated position; and a hanger body supported elevationally above the sprinkler support body when the sprinkler support body is hanging from a lowered position and having a second inter-fitting contact surface comprising a male segment configured to mate with the female segment of the first inter-fitting contact surface, the body disposed to support the sprinkler body at an elevated position;

wherein the sprinkler support body comprises a cylindrical puck and the hanger body comprises a yoke provided on a distal end of the hanger body and having at least one pin extending vertically above the yoke, the yoke configured to envelope the flexible hose adjacent the cylindrical puck.

29. The support of claim 28, wherein the puck includes a circumferential array of apertures extending through a cylindrical profile of the puck.

30. The support of claim 29, wherein each aperture comprises a trapezoidal aperture.

31. The support of claim 29, wherein each aperture comprises a cylindrical aperture.

32. An adaptive support for a flexible hose sprinkler head on an elevated irrigation supply line, comprising:
a sprinkler support body configured to be affixed to one of: a) the flexible hose and b) the sprinkler head and having a first inter-fitting contact surface comprising a male segment, the body disposed to support a downwardly extending flexible sprinkler hose that has been raised to an elevated position; and
a hanger body supported elevationally above the sprinkler support body when the sprinkler support body is hanging from a lowered position and having a second inter-fitting contact surface comprising a female segment configured to mate with the male segment of the first inter-fitting contact surface, the body disposed to support the sprinkler body at an elevated position;
wherein the sprinkler support body comprises a cylindrical puck having a circumferential groove and further comprising a tool arm having a claw with a pair of opposed surfaces with at least one surface articulated relative to another surface and configured to engage and disengage with the circumferential groove to raise and lower the sprinkler support body relative to the hanger body.

33. An adaptive support for a flexible hose sprinkler head on an elevated irrigation supply line, comprising:
a sprinkler support body configured to be affixed to one of: a) the flexible hose and b) the sprinkler head and having a first inter-fitting contact surface comprising a male segment, the body disposed to support a downwardly extending flexible sprinkler hose that has been raised to an elevated position;
a hanger body supported elevationally above the sprinkler support body when the sprinkler support body is hanging from a lowered position and having a second inter-fitting contact surface comprising a female segment configured to mate with the first inter-fitting contact surface, the body disposed to support the sprinkler body at an elevated position; and
a tool arm having a claw with a pair of opposed articulating jaws configured to engage and disengage with the male segment of the sprinkler support body and operative to raise and lower the sprinkler support body relative to the hanger body.

34. An adaptive support for a flexible hose sprinkler head on an elevated irrigation supply line, comprising:
a sprinkler support body configured to be affixed to one of: a) the flexible hose and b) the sprinkler head and having a first inter-fitting contact surface, the body disposed to support a downwardly extending flexible sprinkler hose that has been raised to an elevated position; and
a hanger body supported elevationally above the sprinkler support body when the sprinkler support body is hanging from a lowered position and having a second inter-fitting contact surface configured to mate with the first inter-fitting contact surface, the body disposed to support the sprinkler body at an elevated position;
wherein the sprinkler support body is provided by a sprinkler weight having a plurality of apertures formed therein configured to receive complementary pins on a lifting tool for raising and lowering the support body and sprinkler relative to the hanger body.

35. An adaptive support for a flexible hose sprinkler head on an elevated irrigation supply line, comprising:
a sprinkler support body configured to be affixed to one of: a) the flexible hose and b) the sprinkler head and having a first inter-fitting contact surface, the body disposed to support a downwardly extending flexible sprinkler hose that has been raised to an elevated position; and
a hanger body supported elevationally above the sprinkler support body when the sprinkler support body is hanging from a lowered position and having a second inter-fitting contact surface configured to mate with the first inter-fitting contact surface, the body disposed to support the sprinkler body at an elevated position;
wherein the sprinkler support body comprises a plate affixed relative to the sprinkler head and having a plurality of pins extending from the plate, the second inter-fitting contact surface of the hanger body comprising at least one female contact surface provided in the hanger body sized to receive a respective pin of the sprinkler support body.

36. The support of claim 35, further comprising a lifting tool having an end fitting with at least one female contact surface configured to receive a respective another pin of the sprinkler support body for raising and lowering the sprinkler support body and sprinkler.

37. An adaptive support for a flexible hose sprinkler head on an elevated irrigation supply line, comprising:
a sprinkler support body configured to be affixed to one of: a) the flexible hose and b) the sprinkler head and having a first inter-fitting contact surface, the body disposed to support a downwardly extending flexible sprinkler hose that has been raised to an elevated position; and
a hanger body supported elevationally above the sprinkler support body when the sprinkler support body is hanging from a lowered position and having a second inter-fitting contact surface configured to mate with the first inter-fitting contact surface, the body disposed to support the sprinkler body at an elevated position;
wherein the sprinkler support body is provided by a sprinkler regulator having a frustoconical male outer surface and the first inter-fitting sprinkler contact surface of the hanger body provides a complementary frustoconical female surface on a yoke of the hanger body.

38. An adaptive support for a flexible hose sprinkler head on an elevated irrigation supply line, comprising:
a sprinkler support body configured to be affixed to one of: a) the flexible hose and b) the sprinkler head and having a first inter-fitting contact surface, the body disposed to support a downwardly extending flexible sprinkler hose that has been raised to an elevated position; and
a hanger body supported elevationally above the sprinkler support body when the sprinkler support body is hanging from a lowered position and having a second inter-fitting contact surface configured to mate with the first inter-fitting contact surface, the body disposed to support the sprinkler body at an elevated position;

wherein the hanger body is provided by a unitary hanger body and gooseneck assembly.

39. An adaptive support for a flexible hose sprinkler head on an elevated irrigation supply line, comprising:

a sprinkler support body configured to be affixed to one of: a) the flexible hose and b) the sprinkler head and having a first inter-fitting contact surface, the body disposed to support a downwardly extending flexible sprinkler hose that has been raised to an elevated position; and a hanger body supported elevationally above the sprinkler support body when the sprinkler support body is hanging from a lowered position and having a second inter-fitting contact surface configured to mate with the first inter-fitting contact surface, the body disposed to support the sprinkler body at an elevated position;

wherein the hanger body is configured to be removably mated and demated from a gooseneck.

40. The support of claim 39, wherein a complementary pair of interlocking dovetail members are provided between the hanger body and the gooseneck.

* * * * *